(12) United States Patent
Bugg et al.

(10) Patent No.: US 9,708,206 B2
(45) Date of Patent: Jul. 18, 2017

(54) DISPERSION AND CONDITIONING TECHNIQUES FOR THICK FINE TAILINGS DEWATERING OPERATIONS

(71) Applicant: SUNCOR ENERGY INC., Calgary (CA)

(72) Inventors: Trevor Bugg, Fort McMurray (CA); Ana Sanchez, Calgary (CA); Adrian Revington, Fort McMurray (CA); James Patrick Macaulay, Fort McMurray (CA)

(73) Assignee: SUNCOR ENERGY INC., Calgary, Alberta (CA)

( * ) Notice: Subject to any disclaimer, the term of this patent is extended or adjusted under 35 U.S.C. 154(b) by 181 days.

(21) Appl. No.: 14/408,695

(22) PCT Filed: Jun. 21, 2013

(86) PCT No.: PCT/CA2013/050491
§ 371 (c)(1),
(2) Date: Dec. 17, 2014

(87) PCT Pub. No.: WO2013/188986
PCT Pub. Date: Dec. 27, 2013

(65) Prior Publication Data
US 2015/0144571 A1    May 28, 2015

Related U.S. Application Data

(60) Provisional application No. 61/662,709, filed on Jun. 21, 2012.

(51) Int. Cl.
*C02F 1/56* (2006.01)
*B01D 12/00* (2006.01)
(Continued)

(52) U.S. Cl.
CPC ............ *C02F 1/56* (2013.01); *B01D 12/00* (2013.01); *C02F 1/5209* (2013.01);
(Continued)

(58) Field of Classification Search
CPC ........ C02F 1/56; C02F 1/5209; C02F 1/5281; C10G 1/045; C10G 7/04; B01D 12/00
(Continued)

(56) References Cited

U.S. PATENT DOCUMENTS 3,853,616 A    12/1974  Rundell et al.
4,886,644 A *  12/1989  Chan ................. B01D 45/12
                                                    422/140

FOREIGN PATENT DOCUMENTS

CA    2678818 A1    3/2011
CA    2701317 A1    3/2011
EP    1 371 614 A1  12/2003

OTHER PUBLICATIONS

International Search Report dated Sep. 5, 2013 from International Application No. PCT/CA2013/050491.

* cited by examiner

*Primary Examiner* — Chester Barry
(74) *Attorney, Agent, or Firm* — Baker & Hostetler LLP

(57) ABSTRACT

Techniques are described that relate to enhancing flocculation and dewatering of thick fine tailings, for example by reducing process oscillations. One example method includes dispersing a flocculant into thick fine tailings having a turbulent flow regime to produce turbulent flocculating tailings; subjecting the turbulent flocculating tailings to shear to build up flocs and increase yield stress, to produce a flocculated material having a non-turbulent flow regime; and shear conditioning the flocculated material to decrease the yield stress and produce conditioned flocculated tailings within a water release zone; and dewatering the conditioned
(Continued)

flocculated tailings, for example by employing sub-aerial deposition. The thick fine tailings may have a Bingham Reynolds Number of at least 40,000 upon flocculant addition. Inhibiting process oscillations may include providing turbulent tailings feed, configuring a downstream pipeline assembly to reduce backpressure fluctuations and/or reducing air content in the flocculant solution, for example.

55 Claims, 21 Drawing Sheets

(51) Int. Cl.
  *C10G 7/04* (2006.01)
  *C02F 1/52* (2006.01)
  *C10G 1/04* (2006.01)
  *C02F 103/10* (2006.01)

(52) U.S. Cl.
  CPC ............ *C02F 1/5281* (2013.01); *C10G 1/045* (2013.01); *C10G 7/04* (2013.01); *C02F 2103/10* (2013.01); *C02F 2209/11* (2013.01); *C02F 2209/40* (2013.01)

(58) Field of Classification Search
  USPC ......................................................... 210/709
  See application file for complete search history.

DISPERSION AND CONDITIONING TECHNIQUES FOR THICK FINE TAILINGS DEWATERING OPERATIONS

REFERENCE TO RELATED APPLICATIONS

This application is the U.S. national stage of International application No. PCT/CA2013/050491, filed Jun. 21, 2013, which claims the priority of Canadian application No. 61662709, filed Jun. 21, 2012, the disclosures of which are incorporated in their entireties herein.

FIELD OF THE INVENTION

The present invention generally relates to the dispersion and/or conditioning of thick fine tailings for dewatering operations.

BACKGROUND OF THE INVENTION

Tailings derived from mining operations, such as oil sands mining, are often placed in dedicated disposal ponds for settling.

The settling of fine solids from the water in tailings ponds is a relatively slow process. Certain techniques have been developed for dewatering fine tailings. Dewatering of thick fine tailings can include contacting the thick fine tailings with a flocculant and then depositing the flocculated fine tailings in a deposition area where the deposited material can release water and eventually dry.

There are several factors that may influence the performance of dewatering operations. For instance, inadequate dispersion of the flocculant into the thick fine tailings can decrease the efficiency of the flocculating agent and the overall dewatering. Inadequate mixing may also result in inefficient use of the flocculating agents, some of which remain unmixed and unreacted resulting in higher flocculant dose requirements to achieve optimally dosed conditions.

In the context of dewatering thick fine tailings, there are a number of challenges related to flocculant addition and handling of the resulting flocculation mixture.

SUMMARY OF THE INVENTION

Various techniques are described that may be used for enhancing flocculation and dewatering of thick fine tailings.

In some implementations, there is provided a method of treating thick fine tailings, comprising:
  providing an in-line flow of the thick fine tailings;
  adding a flocculant into the in-line flow of the thick fine tailings to produce an in-line flow of flocculating tailings material, wherein the in-line flow of the thick fine tailings has a turbulent flow regime upon addition of the flocculant;
  shearing the in-line flow of the flocculating tailings material to induce floc build-up, increase a yield stress thereof and reduce turbulence thereof, to thereby produce a non-turbulent in-line flow of flocculated material;
  subjecting the in-line flow of the flocculated material to shear conditioning to decrease the yield stress thereof and produce a conditioned flocculated tailings material that is within a water release zone wherein water separates from the conditioned flocculated tailings material; and
  dewatering the conditioned flocculated tailings material.

In some implementations, the in-line flow of the thick fine tailings has a Bingham Reynolds Number of at least 40,000 upon addition of the flocculant.

In some implementations, the in-line flow of the thick fine tailings has a Bingham Reynolds Number of at least 50,000 upon addition of the flocculant.

In some implementations, the in-line flow of the thick fine tailings has a Bingham Reynolds Number of at least 60,000 upon addition of the flocculant.

In some implementations, the in-line flow of the thick fine tailings has a Bingham Reynolds Number of between 40,000 and 65,000 upon addition of the flocculant.

In some implementations, the in-line flow of the thick fine tailings has a Bingham Reynolds Number of between 45,000 and 60,000 upon addition of the flocculant.

In some implementations, providing the turbulent flow regime comprises regulating a feed flow rate of the thick fine tailings above a minimum threshold.

In some implementations, providing the turbulent flow regime comprises configuring a pipeline assembly that transports the flow of thick fine tailings for addition of the flocculant and transports the flocculating tailings after addition of the flocculant, to have a sufficiently small pipe diameter.

In some implementations, providing the turbulent flow regime comprises ensuring a sufficiently low viscosity of the in-line flow of the thick fine tailings upon addition of the flocculant.

In some implementations, the non-turbulent in-line flow of flocculated material has a laminar flow regime.

In some implementations, the in-line flow of the thick fine tailings is provided by pumping at a substantially constant flow rate.

In some implementations, the in-line flow of the thick fine tailings is provided by pumping at substantially constant rotations per minute.

In some implementations, the adding of the flocculant comprises injecting a solution comprising the flocculant into the in-line flow of the thick fine tailings.

In some implementations, the adding of the flocculant is performed by ratio control with respect to the in-line flow of the thick fine tailings.

In some implementations, the dewatering comprises depositing the conditioned flocculated tailings material onto a sub-aerial deposition site. In some implementations, the dewatering comprises subjecting the conditioned flocculated tailings material to thickening and/or filtering.

In some implementations, there is provided a method of dispersing a flocculant into an in-line flow of thick fine tailings, comprising:
  providing the in-line flow of the thick fine tailings with a turbulent flow regime to provide a turbulent feed;
  adding the flocculant into the turbulent feed to produce an in-line turbulent flow of flocculating tailings material;
  shearing the in-line turbulent flow of the flocculating tailings material to induce floc build-up, increase a yield stress thereof and reduce turbulence thereof, to thereby produce a non-turbulent in-line flow of flocculated material.

In some implementations, the turbulent feed has a Bingham Reynolds Number of at least 40,000 upon addition of the flocculant.

In some implementations, the in turbulent feed has a Bingham Reynolds Number of at least 50,000 upon addition of the flocculant.

In some implementations, the turbulent feed has a Bingham Reynolds Number of at least 60,000 upon addition of the flocculant.

In some implementations, the turbulent feed has a Bingham Reynolds Number of between 40,000 and 65,000 upon addition of the flocculant.

In some implementations, the in turbulent feed has a Bingham Reynolds Number of between 45,000 and 60,000 upon addition of the flocculant.

In some implementations, providing the turbulent flow regime comprises regulating a feed flow rate of the thick fine tailings above a minimum threshold.

In some implementations, providing the turbulent flow regime comprises configuring a pipeline assembly to have a sufficiently small pipe diameter, wherein pipeline assembly transports the turbulent feed and the in-line turbulent flow of flocculating tailings material.

In some implementations, providing the turbulent flow regime comprises ensuring a sufficiently low viscosity of the in-line flow of the thick fine tailings upon addition of the flocculant.

In some implementations, the non-turbulent in-line flow of flocculated material has a laminar flow regime.

In some implementations, the in-line flow of the thick fine tailings is provided by pumping at a substantially constant flow rate.

In some implementations, the in-line flow of the thick fine tailings is provided by pumping at substantially constant rotations per minute.

In some implementations, the adding of the flocculant comprises injecting a solution comprising the flocculant into the turbulent feed.

In some implementations, the adding of the flocculant is performed by ratio control with respect to the turbulent feed.

In some implementations, the adding of the flocculant comprises co-annularly injecting a plurality of jets comprising the flocculant into the turbulent feed.

In some implementations, the jets comprising the flocculant extend into the turbulent feed co-directionally with the flow direction thereof.

In some implementations, there is provided a system for treating thick fine tailings, comprising:
- a feed pipeline assembly for providing an in-line flow of the thick fine tailings;
- a pump for pumping the in-line flow of the thick fine tailings;
- an in-line addition assembly in fluid communication with the feed pipeline assembly for adding a flocculant into the in-line flow of the thick fine tailings to produce an in-line flow of flocculating tailings material;
- wherein the pump, the feed pipeline assembly and the in-line addition assembly are configured to ensure the thick fine tailings has a turbulent flow regime upon addition of the flocculant;
- a floc build-up pipeline assembly in fluid communication with the in-line addition assembly and configured to shear the in-line flow of the flocculating tailings material to increase a yield stress thereof and to produce a non-turbulent in-line flow of flocculated material;
- a shear conditioning pipeline assembly configured to shear condition the non-turbulent in-line flow of flocculated material to decrease the yield stress thereof and produce a conditioned flocculated tailings material that is within a water release zone wherein water separates from the conditioned flocculated tailings material; and
- a dewatering unit in fluid communication with the shear conditioning pipeline assembly for receiving and dewatering the conditioned flocculated tailings material.

In some implementations, the pump, the feed pipeline assembly and the in-line addition assembly are configured to provide the in-line flow of the thick fine tailings with a Bingham Reynolds Number of at least 40,000 upon addition of the flocculant.

In some implementations, the pump, the feed pipeline assembly and the in-line addition assembly are configured to provide the in-line flow of the thick fine tailings with a Bingham Reynolds Number of at least 50,000 upon addition of the flocculant.

In some implementations, the pump, the feed pipeline assembly and the in-line addition assembly are configured to provide the in-line flow of the thick fine tailings with a Bingham Reynolds Number of at least 60,000 upon addition of the flocculant.

In some implementations, the pump, the feed pipeline assembly and the in-line addition assembly are configured to provide the in-line flow of the thick fine tailings with a Bingham Reynolds Number of between 40,000 and 65,000 upon addition of the flocculant.

In some implementations, the pump, the feed pipeline assembly and the in-line addition assembly are configured to provide the in-line flow of the thick fine tailings with a Bingham Reynolds Number of between 45,000 and 60,000 upon addition of the flocculant.

In some implementations, the pump is configured to provide a feed flow rate of the thick fine tailings above a minimum threshold to ensure the turbulent flow regime.

In some implementations, the feed pipeline assembly and the in-line addition assembly are configured to have a sufficiently small pipe diameter to ensure the turbulent flow regime.

In some implementations, the pump, the floc build-up pipeline assembly and the shear conditioning pipeline assembly are configured to such that the non-turbulent in-line flow of flocculated material has a laminar flow regime.

In some implementations, the pump is configured to operate at a substantially constant flow rate.

In some implementations, the pump is configured to operate at substantially constant rotations per minute.

In some implementations, the in-line addition assembly comprising an injector for adding a solution comprising the flocculant into the in-line flow of the thick fine tailings.

In some implementations, the system also includes a flocculant addition controller for controlling the addition of the flocculant into the in-line flow of the thick fine tailings.

In some implementations, the flocculant addition controller is configured to provide ratio control of the flocculant with respect to the in-line flow of the thick fine tailings.

In some implementations, the dewatering unit comprises a sub-aerial deposition site. In some implementations, the dewatering unit comprises a thickener and/or a filter.

In some implementations, there is provided a method of treating thick fine tailings, comprising:
- dispersing a flocculant into the thick fine tailings having a turbulent flow regime to produce a turbulent flocculating tailings material;
- subjecting the turbulent flocculating tailings material to shear to build-up flocs and increase a yield stress thereof, to produce a flocculated material having a non-turbulent flow regime; and
- shear conditioning the flocculated material to decrease the yield stress thereof and produce a conditioned flocculated tailings material that is within a water release zone wherein water separates from the conditioned flocculated tailings material; and dewatering the conditioned flocculated tailings material.

In some implementations, the thick fine tailings has a Bingham Reynolds Number of at least 40,000 upon addition of the flocculant.

In some implementations, the thick fine tailings has a Bingham Reynolds Number of at least 50,000 upon addition of the flocculant.

In some implementations, the thick fine tailings has a Bingham Reynolds Number of at least 60,000 upon addition of the flocculant.

In some implementations, the thick fine tailings has a Bingham Reynolds Number of between 40,000 and 65,000 upon addition of the flocculant.

In some implementations, the thick fine tailings has a Bingham Reynolds Number of between 45,000 and 60,000 upon addition of the flocculant.

In some implementations, the dispersing of the flocculant into the thick fine tailings is performed in-line.

In some implementations, the step of subjecting the turbulent flocculating tailings material to shear is performed in-line.

In some implementations, the step of shear conditioning the flocculated material is performed in-line.

In some implementations, providing the turbulent flow regime comprises regulating a feed flow rate of the thick fine tailings above a minimum threshold.

In some implementations, providing the turbulent flow regime comprises configuring a pipeline assembly that transports the thick fine tailings for addition of the flocculant and transports the flocculating tailings after addition of the flocculant, to have a sufficiently small pipe diameter.

In some implementations, providing the turbulent flow regime comprises ensuring a sufficiently low viscosity of the thick fine tailings upon addition of the flocculant.

In some implementations, the flocculated material has a laminar flow regime.

In some implementations, the dewatering comprises depositing the conditioned flocculated tailings material onto a sub-aerial deposition site.

In some implementations, the dewatering comprises subjecting the conditioned flocculated tailings material to thickening and/or filtering.

In some implementations, there is provided a method of treating thick fine tailings, comprising:

providing a thick fine tailings flow in an upstream pipeline section;

contacting the thick fine tailings flow with a flocculant to produce a flocculation tailings in a dispersion pipeline zone;

transporting the flocculation tailings through a downstream pipeline section; and dewatering the flocculation tailings;

wherein the upstream pipeline section and the dispersion pipeline zone are configured and the thick fine tailings flow is provided so as to have a turbulent flow regime in both the upstream pipeline section and the dispersion pipeline zone.

In some implementations, the thick fine tailings flow has a flow rate that is controlled in accordance with rheological characteristics of the thick fine tailings and pipe diameter of the upstream pipeline section.

In some implementations, the upstream pipeline section has a pipe diameter of at most 12 inches and the dispersion pipeline zone has a pipe diameter sufficient to ensure turbulence and mixing in the dispersion pipeline zone.

In some implementations, the dispersion pipeline zone has a pipe diameter of at most 6 inches.

In some implementations, the downstream pipeline section has a pipe diameter sufficiently large such that the flocculation tailings flowing therethrough has a non-turbulent flow regime.

In some implementations, the downstream pipeline section has a pipe diameter sufficiently large such that the flocculation tailings flowing therethrough has a laminar flow regime.

In some implementations, the thick fine tailings comprise mature fine tailings (MFT). In some implementations, the thick fine tailings comprises tailings derived from an oil sands extraction operation. In some implementations, the thick fine tailings are retrieved from a tailings pond.

In some implementations, there is provided a method of treating thick fine tailings, comprising:

dispersing a flocculant into the thick fine tailings to produce a flocculating tailings material;

subjecting the flocculating tailings material to shear to build-up flocs and increase a yield stress thereof, to produce a non-turbulent in-line flow of flocculated material;

shear conditioning the non-turbulent in-line flow of flocculated material to decrease the yield stress thereof and produce a conditioned flocculated tailings material that is within a water release zone wherein water separates from the conditioned flocculated tailings material, managing flow conditions to inhibit backpressure oscillations caused by increased yield stress of the flocculated tailings; and dewatering the conditioned flocculated tailings material.

In some implementations, the step of managing flow conditions comprises configuring a shear conditioning pipeline assembly transporting the non-turbulent in-line flow of flocculated material to have a sufficiently large pipe diameter to inhibit backpressure oscillations.

In some implementations, the step of configuring the shear conditioning pipeline assembly is performed based on properties of the non-turbulent in-line flow of flocculated material. In some implementations, the properties include yield stress.

In some implementations, the step of configuring the shear conditioning pipeline assembly is performed based on flow rates of the thick fine tailings and/or the non-turbulent in-line flow of flocculated material.

In some implementations, the step of managing flow conditions comprises providing a turbulent flow regime of the thick fine tailings upon contact with the flocculant.

In some implementations, the thick fine tailings has a Bingham Reynolds Number of at least 40,000 upon addition of the flocculant.

In some implementations, the thick fine tailings has a Bingham Reynolds Number of at least 50,000 upon addition of the flocculant.

In some implementations, the thick fine tailings has a Bingham Reynolds Number of at least 60,000 upon addition of the flocculant.

In some implementations, the thick fine tailings has a Bingham Reynolds Number of between 40,000 and 65,000 upon addition of the flocculant.

In some implementations, the thick fine tailings has a Bingham Reynolds Number of between 45,000 and 60,000 upon addition of the flocculant.

In some implementations, the dispersing of the flocculant into the thick fine tailings is performed in-line. In some implementations, the step of subjecting the flocculating tailings material to shear is performed in-line. Alternatively, such steps may be performed in devices other than pipelines and such devices may be interconnected by pipes to transfer the fluid.

In some implementations, providing the turbulent flow regime comprises regulating a feed flow rate of the thick fine tailings above a minimum threshold.

In some implementations, providing the turbulent flow regime comprises configuring a pipeline assembly that transports the thick fine tailings for addition of the flocculant and transports the flocculating tailings after addition of the flocculant, to have a sufficiently small pipe diameter.

In some implementations, providing the turbulent flow regime comprises ensuring a sufficiently low viscosity of the thick fine tailings upon addition of the flocculant.

In some implementations, the non-turbulent in-line flow of flocculated material has a laminar flow regime.

In some implementations, the dewatering comprises depositing the conditioned flocculated tailings material onto a sub-aerial deposition site.

In some implementations, the dewatering comprises subjecting the conditioned flocculated tailings material to thickening and/or filtering.

In some implementations, the flocculant is provided as a flocculant solution. In some implementations, the flocculant solution has a concentration of flocculant of 0.1 wt. % to 1 wt. %. In some implementations, the flocculant solution is an aqueous solution comprising ≤5 wt. %, ≤2 wt. %, ≤1.5 wt. %, or ≤1 wt % of the flocculant. In some implementations, the flocculant solution is an aqueous solution comprising ≤1 wt. %, ≤0.6 wt. % or ≤0.4 wt. % of the flocculating agent. In some implementations, the flocculant comprises an anionic polymer flocculant.

In some implementations, the step of managing flow conditions is provided so as to attenuate oscillations in thick fine tailings flow rate to an average attenuated oscillation amplitude of at most 20 m$^3$/hr. In some implementations, the step of managing flow conditions is provided so as to attenuate oscillations in flocculant flow rate to an average attenuated oscillation amplitude of at most 5 m$^3$/hr.

In some implementations, the step of managing flow conditions comprises: pumping the thick fine tailings using a first pump; controlling the first pump based on a flow rate set point of the thick fine tailings; pumping the flocculant solution using a second pump; controlling the second pump based on a flow rate set point of the flocculant solution; and regulating the flow rate set point of the flocculant solution based on flow rate, density and/or clay content of the thick fine tailings. In some implementations, the first and second pumps are centrifugal pumps. In some implementations, the first and second pumps are positive displacement pumps.

In some implementations, the step of managing flow conditions comprises avoiding flow restrictions with respect to the non-turbulent in-line flow of flocculated material. In some implementations, the step of managing flow conditions comprises avoiding obstructions with respect to the non-turbulent in-line flow of flocculated material. In some implementations, the step of managing flow conditions comprises avoiding pipeline diameter reductions with respect to the non-turbulent in-line flow of flocculated material. In some implementations, the step of managing flow conditions comprises providing a substantially constant pipe diameter for transporting the flocculating tailings material and the non-turbulent in-line flow of flocculated material.

In some implementations, there is provided a method of treating thick fine tailings, comprising:
pumping the thick fine tailings to provide an in-line thick fine tailings flow;
pumping a flocculant solution comprising a flocculant to provide an in-line flocculation solution flow,
contacting the in-line thick fine tailings flow with the in-line flocculant solution flow to produce a flocculation tailings;
shear conditioning the flocculation tailings to produce a conditioned flocculated tailings material;
dewatering the conditioned flocculated tailings material; and
implementing a flow control strategy comprising:
setting a substantially constant flow rate for the in-line thick fine tailings flow;
setting a substantially constant flocculant dosage of the in-line flocculant solution flow based on flow rate, density and/or clay content of the in-line thick fine tailings flow; and
wherein the substantially constant flow rate of the in-line thick fine tailings flow is above a minimum threshold to provide sufficient turbulence to substantially attenuate oscillations in both the flow rate of the in-line flocculant solution flow and the in-line thick fine tailings flow.

In some implementations, the flow rate of the thick fine tailings flow is turbulent. In some implementations, the flow rate is at least 400 m$^3$/hr within a pipeline having a diameter of at most 12 inches.

In some implementations, the flow management comprises providing a flow rate in the pipeline that is turbulent and related to the size of the pipeline and the characteristics of the thick fine tailings.

In some implementations, the flocculant flow comprises a solution having a concentration of flocculating agent between 0.1 wt. % to 1 wt. %. In some implementations, the flocculant is an anionic polymer flocculant. In some implementations, the solution comprising the flocculating agent is an aqueous solution comprising ≤5 wt. %, ≤2 wt. %, ≤1.5 wt. %, or ≤1 wt. % of said flocculating agent. In some implementations, the solution comprising the flocculating agent is an aqueous solution comprising ≤1 wt. %, ≤0.6 wt. % or ≤0.4 wt. % of said flocculating agent.

In some implementations, the flow rate of the in-line thick fine tailings flow is sufficient to attenuate oscillations in thick fine tailings flow rate to an average attenuated oscillation amplitude of at most 20 m$^3$/hr. In some implementations, the flow rate of the in-line thick fine tailings flow is sufficient to attenuate oscillations in flocculant flow rate to an average attenuated oscillation amplitude of at most 5 m$^3$/hr. In some implementations, the flow rate of the in-line thick fine tailings flow is sufficient to attenuate oscillations in thick fine tailings flow rate and/or attenuate oscillations in flocculant flow rate by at least 90% based on average oscillation amplitude.

In some implementations, there is provided a method for attenuating oscillations in flow rates of an in-line flocculant solution flow comprising a flocculant and an in-line thick fine tailings flow that are contacted together, comprising providing the in-line thick fine tailings flow with a flow rate above a minimum threshold to provide a turbulent flow regime upon contact with the in-line flocculant solution flow sufficient to disperse the flocculant into the thick fine tailings and produce an in-line flocculation tailings flow having a substantially stable rheological profile along a downstream pipeline.

In some implementations, the minimum threshold is sufficient such that the in-line thick fine tailings flow has a Bingham Reynolds Number of at least 40,000 upon contact with the flocculant solution.

In some implementations, the minimum threshold is sufficient such that the in-line thick fine tailings flow has a Bingham Reynolds Number of at least 50,000 upon addition of the flocculant solution.

In some implementations, the minimum threshold is sufficient such that the in-line thick fine tailings flow has a Bingham Reynolds Number of at least 60,000 upon addition of the flocculant solution.

In some implementations, the minimum threshold is sufficient such that the in-line thick fine tailings flow has a Bingham Reynolds Number of between 40,000 and 65,000 upon addition of the flocculant solution.

In some implementations, the minimum threshold is sufficient such that the in-line thick fine tailings flow has a Bingham Reynolds Number of between 45,000 and 60,000 upon addition of the flocculant solution.

In some implementations, addition of the flocculant solution is performed by ratio control with respect to the in-line flow of the thick fine tailings. In some implementations, the ratio control comprises volumetric ratio control or mass ratio control.

In some implementations, there is provided a method for attenuating oscillations in a flow rate of a flocculant solution comprising a flocculant injected into a flow of thick fine tailings, comprising reducing and/or inhibiting and/or minimizing air content in the flocculant solution prior to injection.

In some implementations, reducing air content comprises reducing a viscosity of the flocculant solution sufficient to promote air liberation. In some implementations, reducing the viscosity of the flocculant solution comprises reducing a concentration of the flocculant therein. In some implementations, reducing the concentration of the flocculant comprises reducing by 50%. In some implementations, reducing the concentration of the flocculant comprises reducing to at most 1 wt % flocculant per total weight of the flocculant solution.

In some implementations, the method also includes providing the flow of thick fine tailings with a turbulent flow regime. In some implementations, the flow of thick fine tailings has a Bingham Reynolds Number of at least 40,000 upon contact with the flocculant solution. In some implementations, the flow of thick fine tailings has a Bingham Reynolds Number of at least 50,000 upon contact with the flocculant solution. In some implementations, the flow of thick fine tailings has a Bingham Reynolds Number of at least 60,000 upon contact with the flocculant solution. In some implementations, the flow of thick fine tailings has a Bingham Reynolds Number of between 40,000 and 65,000 upon contact with the flocculant solution. In some implementations, the flow of thick fine tailings has a Bingham Reynolds Number of between 45,000 and 60,000 upon contact with the flocculant solution.

It should also be noted that various features and implementations described above may be combined with other features and implementations described above and/or herein. For example, one or more features related to minimizing air content in the flocculant solution may be combined with one or more features related to inhibiting oscillation in the flow rates and/or providing turbulent flow regime.

DETAILED DESCRIPTION

The present invention relates to the dispersion and/or handling of flocculation tailings in order to enhance the dewatering operation of thick fine tailings.

Some techniques for enhancing the dewatering process concern reducing or attenuating oscillations in the flow of certain streams. Flow oscillations in the thick fine tailings or flocculant streams can cause variations in the dewatering operations that reduce performance. Before elaborating on the various techniques for reducing oscillations and improving the dewatering operations, some general descriptions will be provided.

Introduction and General Overview

In some implementations, the thick fine tailings are suspensions derived from an oil sands mining operation and are oil sands mature fine tailings (MFT) stored in a tailings pond. For illustrative purposes, the techniques described below are described in reference to this example type of thick fine tailings, i.e., MFT, however, it should be understood that the techniques described can be used for thick fine tailings derived from sources other than an oil sands mining operation.

Figure 1:
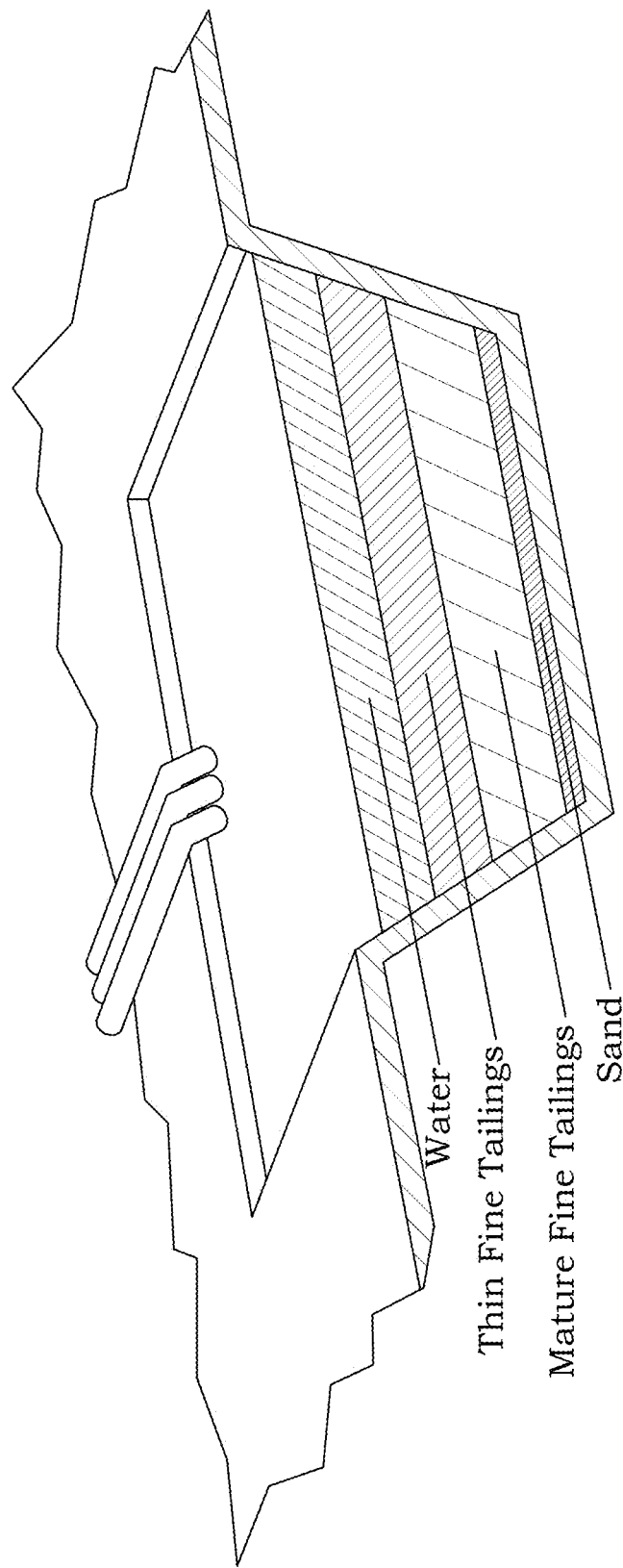
FIG. 1 represents typical settling layers for tailings ponds.

Referring to FIG. 1, tailings are left over material derived from a mining extraction process. By way of illustrative example, the mining extraction process can be a process for extracting bitumen from the oil sands.

"Thick fine tailings" are suspensions derived from a mining operation and mainly include water and fines. The fines are small solid particulates having various sizes up to about 44 microns. The thick fine tailings have a solids content with a fines portion sufficiently high such that the fines tend to remain in suspension in the water and the material has slow consolidation rates. More particularly, the thick fine tailings may have a ratio of coarse particles to the fines that is less than or equal to 1. The thick fine tailings has a fines content sufficiently high such that flocculation of the fines and conditioning of the flocculated material can achieve a two phase material where release water can flow through and away from the flocs. For example, thick fine tailings may have a solids content between 10 wt % and 45 wt %, and a fines content of at least 50 wt % on a total solids basis, giving the material a relatively low sand or coarse solids content. The thick fine tailings may be retrieved from a tailings pond, for example, and may include what is commonly referred to as "mature fine tailings" (MFT).

"MFT" refers to a tailings fluid that typically forms as a layer in a tailings pond and contains water and an elevated content of fine solids that display relatively slow settling rates. For example, when whole tailings (which include coarse solid material, fine solids, and water) or thin fine tailings (which include a relatively low content of fine solids and a high water content) are supplied to a tailings pond, the tailings separate by gravity into different layers over time. The bottom layer is predominantly coarse material, such as sand, and the top layer is predominantly water. The middle layer is relatively sand depleted, but still has a fair amount of fine solids suspended in the aqueous phase. This middle layer is often referred to as MFT. MFT can be formed from various different types of mine tailings that are derived from the processing of different types of mined ore. While the formation of MFT typically takes a fair amount of time when derived from certain whole tailings supplied form an extraction operation (e.g., between 1 and 3 years under gravity settling conditions in the pond), it should be noted that MFT and MFT-like materials may be formed more rapidly depending on the composition and post-extraction processing of the tailings, which may include thickening or other separation steps that may remove a certain amount of coarse solids and/or water prior to supplying the processed tailings to the tailings pond.

It should be understood that the systems and techniques described herein can be applied to thick fine tailings derived from mining operations other than oil sands mining operations. For illustrative purposes, some of the techniques and systems are described below in the context of thick fine tailings derived from oil sands mining operations, including for example mature fine tailings (MFT), but it should be understood that other types of thick fine tailings could also be used.

In the context of oil sands, tailings may include fine and coarse mineral particles, water and residual bitumen. Tailings may be stored in large reservoirs called tailings ponds. FIG. 1 displays typical settling layers for tailings ponds. The coarse mineral material settles out on the bottom while free process effluent water separates to the top. The middle layers are composed of the fine clay particles suspended in water. Initially, these suspended fines may be referred to as thin fine tailings (TFT) before consolidating typically over the course of two to three years and becoming mature fine tailings (MFT) which is an example of thick fine tailings.

Figure 2:
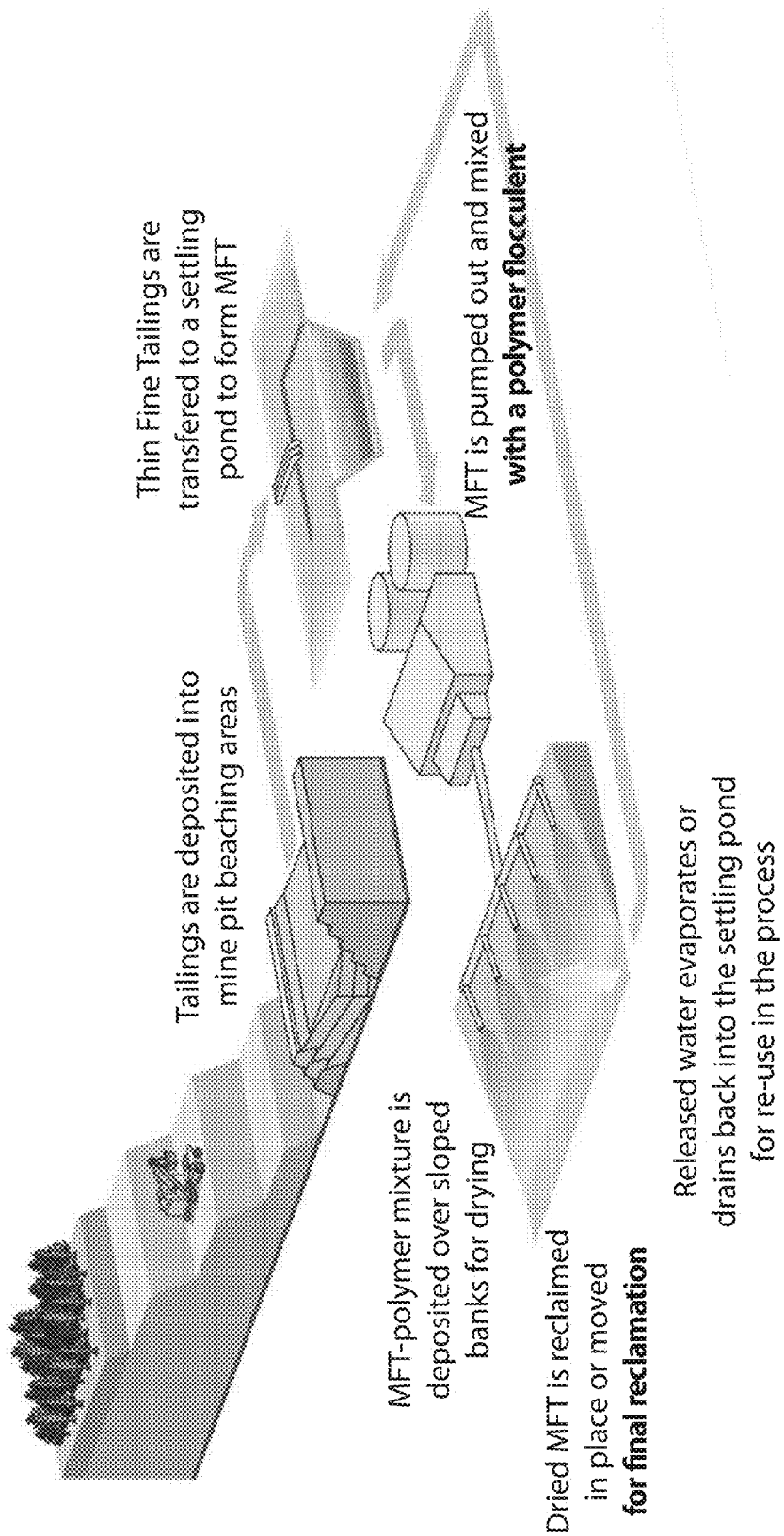
FIG. 2 represents a general view of a Tailings Reduction Operation (TRO) according to Applicant's technology.

FIG. 2 represents a general view of a dewatering operating for the treatments of thick fine tailings, such as MFT.

Figure 2A:
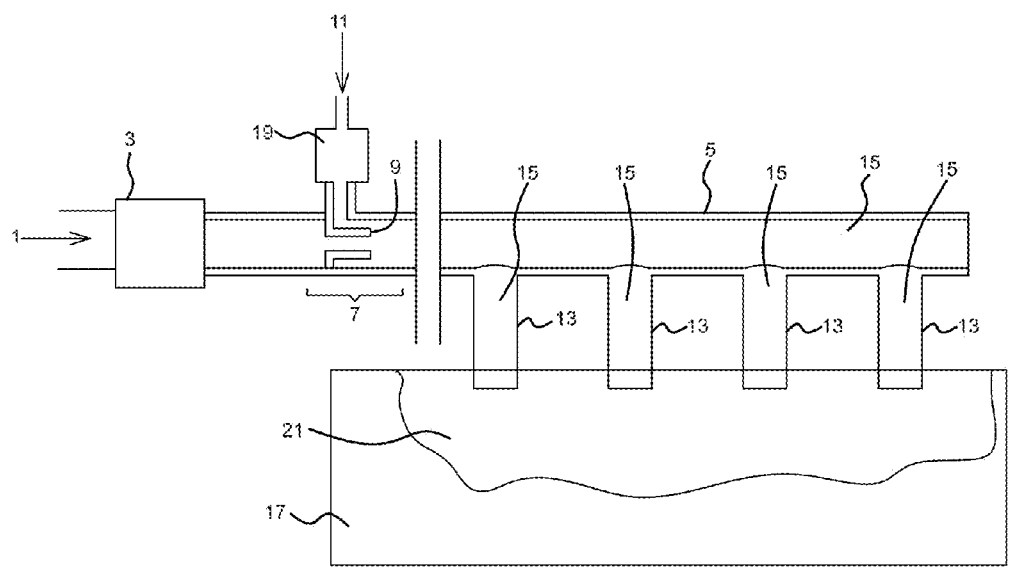
FIG. 2a represents a schematic view of the pumping devices, pipeline and branches (optionally provided with spigots) according to Applicant's technology.

More particularly, as illustrated on FIG. 2a, thick fine tailings 1 may be pumped by a pump 3 from a tailing pond (as illustrated in FIGS. 1 and 2) and flows through a pipeline 5 which is provided with a chemical addition portion 7 including an injector 9 for in-line addition of a solution comprising a flocculating agent 11. The pipeline 5 may also include a downstream portion (which may also be referred to as a "header") that may include branches 13, optionally provided with outlet spigots, allowing deposition of the treated fine tailings 15 onto a deposition area 17.

In some implementations, the pipeline may have certain dimensions to enable improved processing. For example, the feed portion of the pipeline for supplying the thick fine tailings feed flow to the flocculant injection point may be sized, configured and operated such that the thick fine tailings feed flow has a turbulent flow regime to ensure dispersion of flocculant into the thick fine tailings; the floc build-up portion of the pipeline downstream of the flocculant injection point may be sized, configured and operated such that the flocculating tailings material transition from turbulent to laminar flow as the material undergoes floc build-up and increases in yield stress; and the conditioning portion of the pipeline downstream of the floc build-up portion may be sized, configured and operated such that the flocculated material has a laminar flow regime and undergoes floc breakdown until reaching water release zone and is thus deposited. Each of the pipeline portions may be sized, configured and operated according to certain methods and/or constraints that may be present, as will be explained further below. For example, the feed portion of the pipeline may be provided based on ensuring turbulence of the thick fine tailings feed, the floc build-up portion of the pipeline may be provided based on computational fluid dynamic (CFD) modelling to reach a peak yield stress level to complete floc build-up, and the floc breakdown portion of the pipeline may be provided based on a pre-determined shear parameter, such as the Camp Number, that may be derived in a laboratory setting.

In some implementations, the entire pipeline has substantially the same diameter and thus the operation may be adapted and controlled by providing certain flow rates, fluid properties, pipe lengths, and so on, to achieve the desired effects in each pipeline portion for effective flocculation and dewatering. Alternatively, the pipeline portions may have different diameters, and the operation may be adapted accordingly. In some implementations, the floc build-up and floc breakdown portions of the pipeline may have a 12 inch diameter, and may also have an overall length from the chemical addition portion 7 to the outlet spigots of less than 100 meters. It should be understood that various other diameters and lengths of pipeline may be used in conjunction with the operating conditions that are implemented. In addition, various types of pumps may be used to move the fluid through the pipeline, and depending on the type and horsepower of the pumps the pipeline and operating conditions may be adjusted. More regarding the above will be discussed further below.

Figure 3:
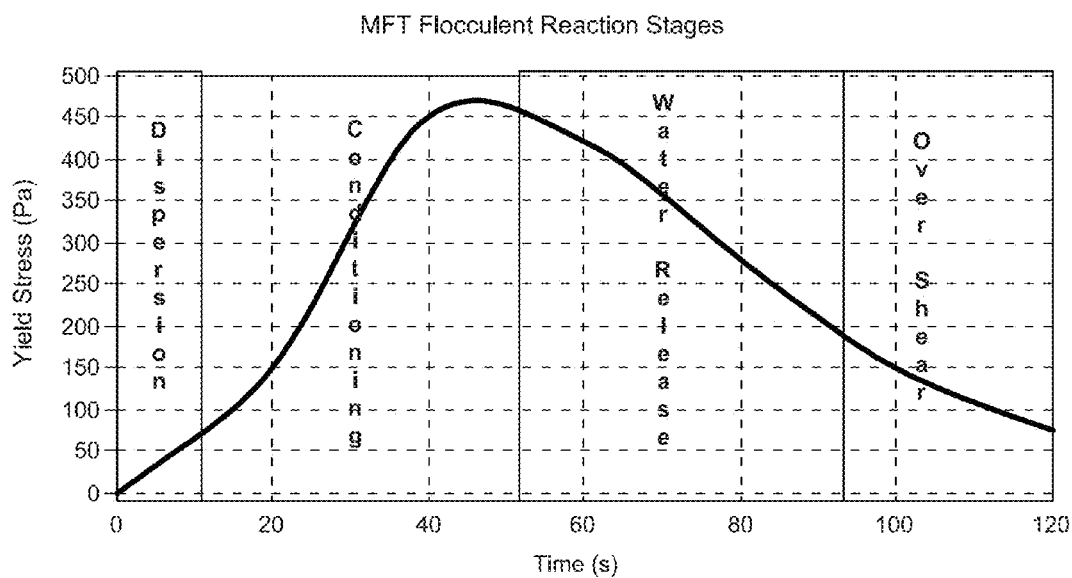
FIG. 3 represents a graph of shear yield stress versus time.

FIG. 3 illustrates general stages of the flocculation reaction over time, particularly in relation to static yield stress.

Figure 4:
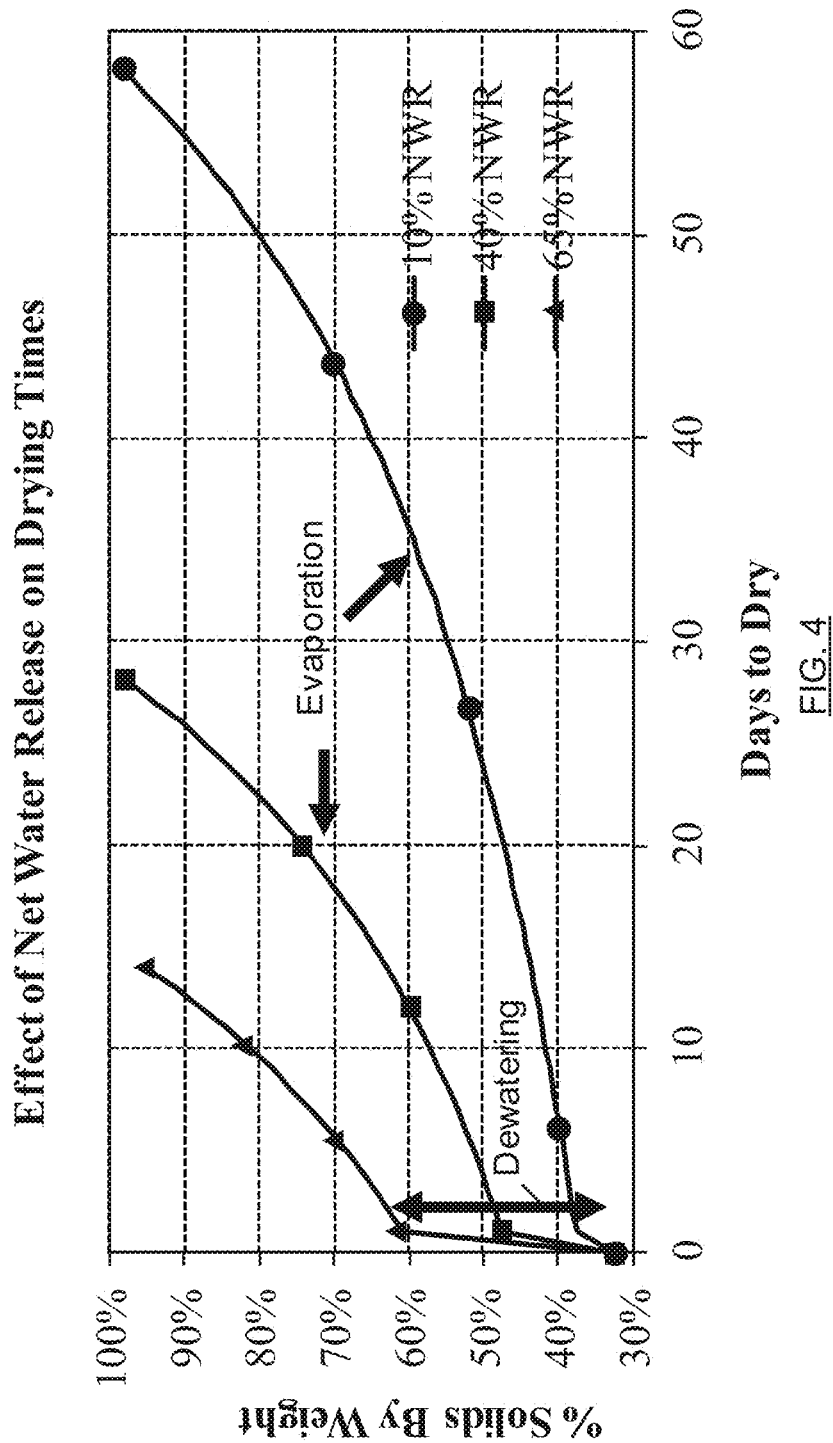
FIG. 4 represents the effect of net water release on the drying times for treated mature fine tailings (MFT) deposits.

FIG. 4 displays the effect of Net Water Release (NWR) has on the drying times of flocculated fine tailings. NWR is a metric that has been developed and is a measure of the differential in water between the starting thick fine tailings and the treated and drained thick fine tailings after a given draining time. In other words, NWR is a difference in moisture contents. The draining time may be 24 hours, 12 hours, 20 minutes, or 19 minutes, for example, or another representative time period for drainage in commercial applications. There are two main ways to calculate the NWR by volumetric or solid content difference. Example formula to calculate the NWR are as follows:

$$NWR = \left(\frac{\text{Quantity of water Recovered} - \text{Quantity of Flocculant Water Added}}{\text{Quantity of intial Fine Tailings Water}}\right)$$

$$NWR = 1 - \left(\frac{1}{tMFT \text{ wt\% mineral} + \text{wt\% Bitumen} - 1}\right) + \left(\frac{1}{MFT \text{ wt\% mineral} + \text{wt\% Bitumen} - 1}\right)$$

A NWR test may be conducted using immediate drainage of a flocculation tailings sample for a drainage time of about 20 minutes. In this regard, for optimal dosage range and good flocculation, the water release in 10 or 20 minutes may be about 80% of the water release that would occur over a 12 to 24 hour period. For underdosed or overdosed samples, the water release in 20 minutes may be about 20% to 60% of the water release that would occur over a 12 to 24 hour period. The 20 minute NWR test may therefore be followed by a longer NWR test, e.g. 12 hour drainage time, which may use a water volume or solids content measurement approach. It is also noted that the laboratory and field tests described herein used a volumetric 24 hour NWR test. Referring back to FIG. 4, it can be seen that a greater initial water release results in a shorter drying duration that is required to achieve a certain solids target. The NWR is dependent on several factors, including the dispersion of the flocculant into the thick fine tailings and the subsequent conditioning (including mixing) of the flocculation tailings. Rapid and thorough dispersion is preferred for increasing NWR.

Figure 5:
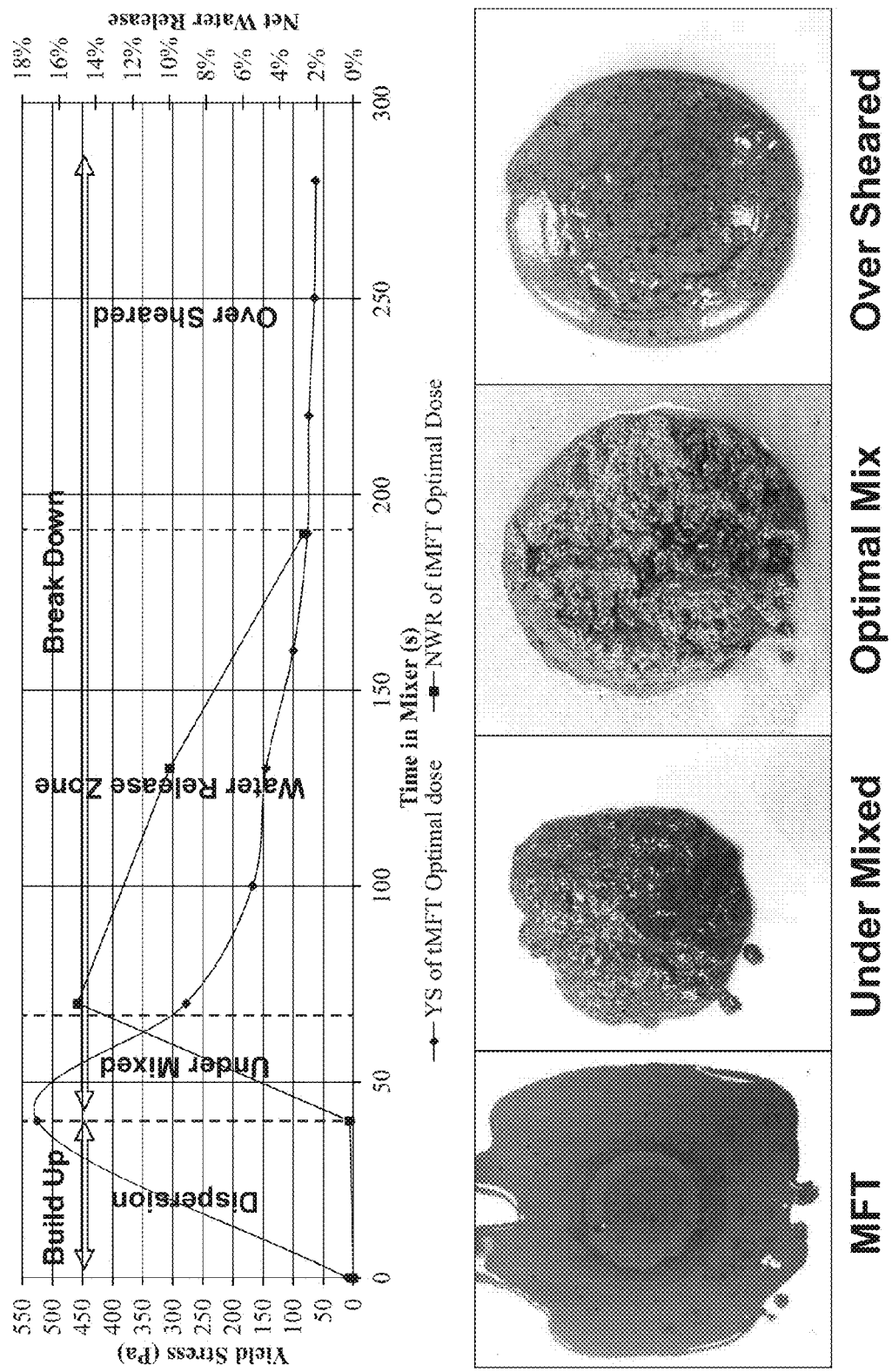
FIG. 5 represents laboratory phases of MFT.

FIG. 5 displays four regions of flocculated tailings (also identified as tMFT) behaviour that have been observed. FIG. 5 is similar to FIG. 3, but its stages will be presented in a slightly different manner.

As can be seen from FIG. 5, the rheological evolution of thick fine tailings, such as MFT, that is subjected to flocculation may include the following stages:

(a) A dispersion stage where a flocculation reagent is rapidly mixed into the fine tailings and the flocculation begins, forming the flocculation tailings material.

(b) A floc build-up stage where the flocculation tailings material increases in yield stress. In this stage, the flocculation tailings material reaches a peak yield stress. Up to and around this peak yield stress the flocculation tailings material may be said to be "under-mixed" because insufficient mixing or conditioning has been performed to begin to breakdown the flocculated matrix and allow increased water release. FIG. 5 shows that the water release is effectively nil up to a certain point just after the peak yield stress, after which the water release increases up to an initial maximum. Within this floc build-up and under-mixed stage, the flocculation tailings material can resemble a gel state material and this stage also becomes smaller with improved dispersion.

(c) A floc breakdown stage where the flocculation tailings material decreases in yield shear stress. This stage includes a water release zone where water is released from the flocculated matrix. FIG. 5, for example, illustrates the water release zone beginning at a certain point within the floc breakdown stage, after the peak water release, and spanning a certain mixing time interval over which the water release gradually decreases. In this stage, the flocculated matrix takes on a more permeable state and water is released at within the water release zone.

(d) An over-shear zone, which is avoided, where the flocs are broken down to a point that the material generally returns to a similar states as the initial fine tailings. Little to no water can release from the broken down flocculation matrix.

In order to facilitate efficient dewatering operations, it is desirable that the flocculation tailings material be deposited within the water release zone in a consistent manner.

Inhibiting Process Oscillations

In the flocculation and dewatering operation, the properties of the fluids are relatively complex and undergo rheological evolution throughout the process. Oscillations in flow rates, pressures, and flocculated material quality were observed for certain configurations of the pipeline. The oscillations were found to be a symptom of certain configurations and operating parameters of the overall system.

In one example configuration, the pumps supplying the MFT feed were near maximum capacity and the feed flow rate was laminar, transitional or borderline turbulent entering the flocculant injection point. The amount of flocculant addition required to achieve optimally dosed MFT is affected by the initial dispersion of flocculant into the MFT. In particular, poor dispersion has higher dosing requirements to achieve an optimally dosed MFT. The efficacy of dispersion can be affected by a number of parameters including MFT flow regime with good dispersion occurring when MFT is in turbulent flow. In addition, the flocculation tailings material has different rheology depending on whether the thick fine tailings are optimally dosed, overdosed or underdosed with flocculant. When optimally dosed, the flocculated material attains the highest yield stress causing highest backpressure in the pipeline. When underdosed or overdosed, the flocculated material attains a lower yield stress causing lower backpressures in the pipeline. Thus, as the flocculant dosage approaches optimal, the backpressure in the pipeline increases to a maximum. In turn, the pumps transporting the fluid were operating at fixed RPM (not flow controlled), since the pumps were at maximum capacity. With fixed pump RPM, as backpressure increases due to optimal flocculant dosing, the line pressure increases and therefore the thick fine tailings flow rate decreases for the fixed RPM operation of the pumps. Furthermore, the flocculant addition was performed by adding a flocculant solution which was ratio controlled according to the flow rate of the thick fine tailings to target a constant dose setpoint. The decrease in the flow rate of the thick fine tailings can lead to a decrease in flocculant dosing with a minor lag time. Moreover, with reduced MFT flowrates, reduced dispersion of flocculant occurred. As mentioned above, poor dispersion results in inefficient flocculate use and in a higher flocculant dose requirement to achieve optimally dosed conditions. With flocculant dose kept constant using a control system, the MFT became underdosed or non-optimally dosed. As mentioned above, non-optimal flocculant dosing, such as underdose, leads to a reduction in the yield stress of the flocculated tailings material which, in turn, causes the backpressure in the line to decrease. Again, since the pumps have a fixed RPM, the flow rate of the thick fine tailings increases in response to the decrease in line backpressure, returning to turbulent flow regime with good dispersion and optimal flocculant dosing conditions per the constant dose setpoint maintained by the control system. This leads again to the higher backpressure issues. In this manner, the process experienced cyclical or oscillatory operations.

The dewatering system may be configured and operated to inhibit process oscillations. Inhibiting oscillations may be performed using various methods depending on the dewatering system equipment and constraints. For example, an existing system including certain components may be retrofitted and/or operated to as to inhibit oscillations; or a system may be designed, constructed and operated so as to inhibit oscillations. In some implementations, the thick fine tailings flow is provided with a turbulent flow regime upon addition of the flocculant. Flocculant injectors enabling turbulence eddies have been implemented in the context of flocculating and dewatering thick fine tailings. However, it is also advantageous to provide the flow of the thick fine tailings itself in a turbulent flow regime upon addition of the flocculant. Providing turbulent pipe flow may include pumping the thick fine tailings above a minimum flow rate threshold for a given pipe diameter, configuring the pipeline so as to have sufficient dimensions (e.g., pipe diameter), pre-treating the thick fine tailings so as to reduce the viscosity thereof, or other methods of providing a high Reynolds Number.

In some scenarios, where existing pumps and piping provide certain constraints such as pumps being at maximum capacity, oscillations in backpressure may also be reduced by modifying the portions of the pipeline that receive and transport the higher yield stress material. In one example, it was found that changing the header pipe diameter (e.g., from 8" diameter piping to 12" piping) reduced oscillations and improved consistent flocculation and deposition in the water release zone. These changes also contributed to allowing for higher flow rates that remained steadier as well as a more stable discharge pressure. More regarding such scenarios will be discussed further below in relation to the implementation of a modified header design in an existing dewatering operation.

In some scenarios, the dewatering system is configured to include piping having sufficient strength for high pressures and pumps that can provide sufficient force to provide thick fine tailings feed flow rates to be above the turbulent transition point regardless of the downstream piping configuration. In order to ensure turbulent conditions, the feed of the thick fine tailings is provided with a turbulent flow regime for optimal flocculant dosing (i.e., the flocculant dosing which results in the highest yield stress and backpressure scenario).

Various implementations, observations and data will now be discussed in relation to certain ways of inhibiting process oscillations in a thick fine tailings dewatering operation.

Figure 6:
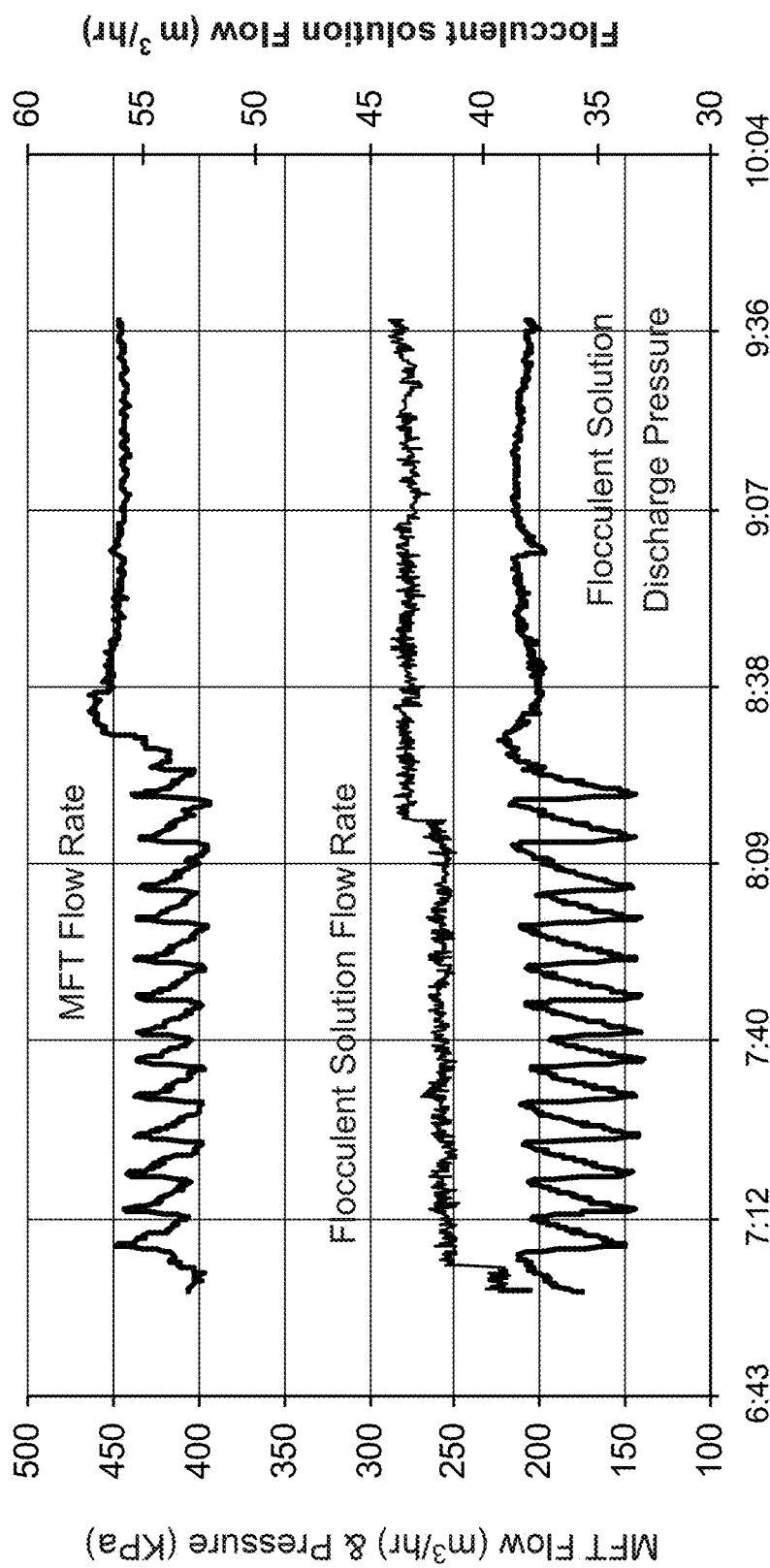
FIGS. 6 and 7 represent variations net water release and flow rate in a TRO.
Figure 7:
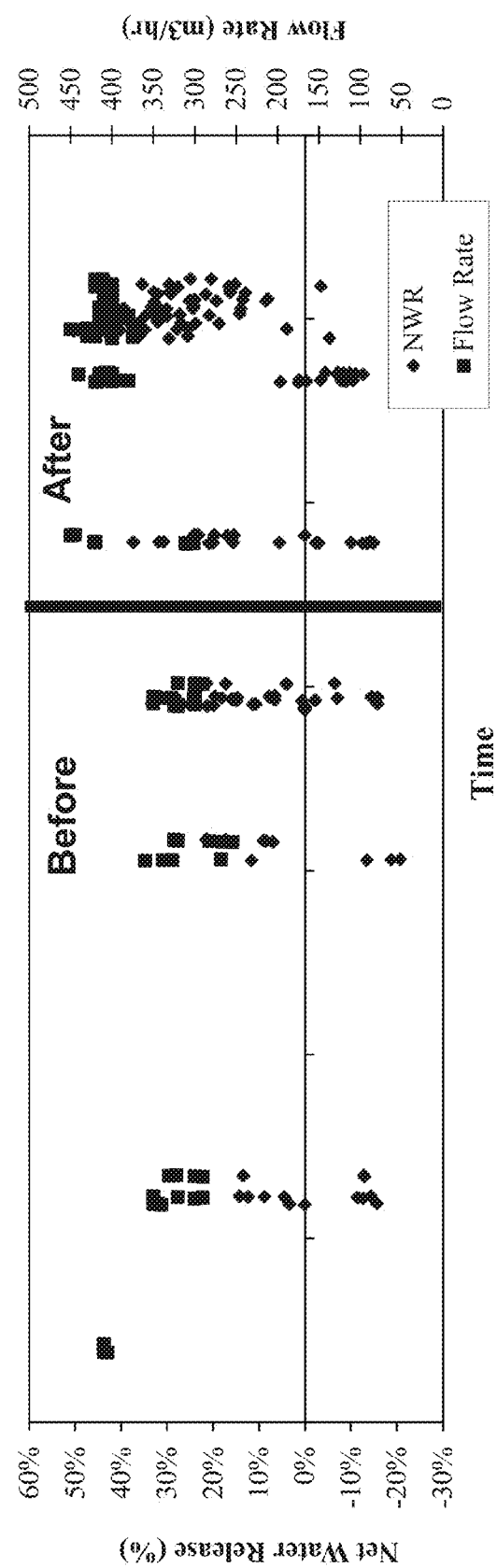

FIGS. 6 and 7 show process data for a dewatering operation which was modified by removing an in-line mixer that was usually present just downstream of flocculant addition. The mixer was a set of baffles provided across the pipeline after the injector and defining a second stage mixer. These figures represent data gathered from laboratory results and process data for four cells tested over an operating season before and after the mixers were removed. They also show that there was a general increase in the NWR trend along with an increase in the flow rates at these cells after the mixers were removed. Removing the mixer can be viewed as reducing a restriction on the downstream pipeline configuration to flocculation tailings flow.

Table 1 shows MFT flow rates, flocculating agent dosage and NWR for deposition cells affected by the mixer removal trial, while Table 2 has data from other deposition cells for comparison purposes. In these tables, the term "polymer" corresponds to the flocculating agent which was a polymer flocculant (in particular a 30% charge anionic polyacrylamide-sodium polyacrylate co-polymer with a molecular weight over 10,000,000). The table for the first deposition cells demonstrates an increase in the mature fine tailings flow rate and a decrease in the flocculating agent dosage. For the other cells, which operated with mixers, it can be seen that there is an increase in the flow rate while the flocculating agent dosage remained relatively constant. The removal of the mixer appears to have aided in the flocculant dispersion for the first deposition cells with the mixers removed, as the flocculant dosage and polymer solution flow rates to acquire higher NWR are lower. It can also be seen that in the other cells the NWR increases significantly as well with the increase in MFT flow rate.

TABLE 1

South Cells 1, 2, 3 and 4 Before and After Komax Mixer Removal

| Status | MFT Flow (m³/hr) | Polymer Sol. Flow (m³/hr) | Polymer Dosage (ppm) | NWR (%) | Dosage on clay basis (ppm) |
|---|---|---|---|---|---|
| Before | 319 | 55.4 | 1803 | 9% | 2391 |
| After | 398 | 43.8 | 1303 | 18% | 1544 |

TABLE 2

North Cells 1, 2, 3 and 4 Before and After Komax Mixer Removal

| Status | MFT Flow (m³/hr) | Polymer Sol. Flow (m³/hr) | Polymer Dosage (ppm) | NWR (%) | Dosage on clay basis (ppm) |
|---|---|---|---|---|---|
| Before | 337 | 41.2 | 1271 | 16% | 1706 |
| After | 367 | 41.7 | 1181 | 26% | 1619 |

Table 3 shows an overview of a thick fine tailings flow regime analysis model. Using the inputs of inner pipe diameter, pipe roughness, MFT density and MFT flow rate, the flow regime model analyzes the wall stresses that should be overcome for the flow of MFT to become turbulent. The main outputs from this model include the flow regime, the theoretical effective viscosity, the Bingham Reynolds Number and the actual wall stress.

TABLE 3

MFT Bingham Flow Regime Model

| Pipe Information | Plastic | | | | | | | | | | | | |
|---|---|---|---|---|---|---|---|---|---|---|---|---|---|
| Pipe NPS | 12 | in | | | | | | | | | | | |
| Pipe ID | 9.746 | in | | | | | | | | | | | |
| Pipe Area | 74.601 | in2 | | | | | | | | | | | |
| Pipe Roughness | 0.0015 | mm | | | | | | | | | | | |
| Fluid Information | | | | | | | | | | | | | |
| MFT Density | 1.40 | SG | 1400 | kg/m3 | | | | | | | | | |
| % Solids | 45.89% | | | | | | | | | | | | |
| Yield Stress, $T_y$ | 5.945 | Pa | | | | | | | | | | | |
| Plastic Viscosity, $\mu_p$ | 12.9016 | mPas | 0.01290 | Pas | | | | | | | | | |
| Flow Information | | | | | | | | | | | | | |
| MFT Flowrate (m3/hr) | 250 | 275 | 300 | 325 | 350 | 375 | 400 | 425 | 450 | 475 | 500 | | |
| Bulk Flow Velocity (m/s) | 1.44 | 1.59 | 1.73 | 1.88 | 2.02 | 2.16 | 2.31 | 2.45 | 2.60 | 2.74 | 2.89 | | |
| Initial Laminar Wall Stress, $T_{wt}$ (Pa) | 8.53 | 8.59 | 8.65 | 8.71 | 8.77 | 8.83 | 8.89 | 8.95 | 9.01 | 9.07 | 9.13 | | |
| Bingham Laminar Regime | | | | | | | | | | | | | |
| Actual Laminar Wall Stress, $T_{wt}$ (Pa) | 7.57 | 7.66 | 7.76 | 7.85 | 7.94 | 8.02 | 8.11 | 8.19 | 8.27 | 8.36 | 8.44 | | |
| Laminar Stress Ratio ($\xi_l$) | 0.79 | 0.78 | 0.77 | 0.76 | 0.75 | 0.74 | 0.73 | 0.73 | 0.72 | 0.71 | 0.70 | | |
| Laminar Bulk Velocity, $V_{lam}$ (m/s) | 1.44 | 1.59 | 1.73 | 1.88 | 2.02 | 2.16 | 2.31 | 2.45 | 2.60 | 2.74 | 2.89 | | |
| Laminar To Bulk Flow Error (m/s) | 0.00 | 0.00 | 0.00 | 0.00 | 0.00 | 0.00 | 0.00 | 0.00 | 0.00 | 0.00 | 0.00 | | |
| Bingham Turbulent Regime | | | | | | | | | | | | | |
| Actual Turbulent Wall Stress, $T_{wt}$ (Pa) | 6.86 | 7.53 | 8.70 | 10.37 | 12.33 | 14.43 | 16.62 | 18.90 | 21.26 | 23.70 | 26.23 | | |
| Turbulent Stress Ratio ($\xi_t$) | 0.87 | 0.79 | 0.68 | 0.57 | 0.48 | 0.41 | 0.36 | 0.31 | 0.28 | 0.25 | 0.23 | | |
| Effective Viscosity, $\mu_{eff}$ (Pas) | 0.0970 | 0.0612 | 0.0407 | 0.0302 | 0.0249 | 0.0219 | 0.0201 | 0.0188 | 0.0179 | 0.0172 | 0.0167 | | |
| Initial Newtonian Velocity, $V_{Ni}$ (m/s) | 0.96 | 1.10 | 1.28 | 1.48 | 1.68 | 1.87 | 2.05 | 2.23 | 2.40 | 2.56 | 2.72 | | |
| Bingham Reynolds Number (Re) | 3429 | 6238 | 10901 | 17011 | 23415 | 29588 | 35446 | 41022 | 46369 | 51529 | 56538 | | |
| Churchill Friction Factor, $f_N$ | 0.01063 | 0.00887 | 0.00757 | 0.00673 | 0.00621 | 0.00587 | 0.00563 | 0.00544 | 0.00529 | 0.00517 | 0.00506 | | |
| Calc. Newtonian Velocity, $V_N$ (m/s) | 0.96 | 1.10 | 1.28 | 1.48 | 1.68 | 1.87 | 2.05 | 2.23 | 2.40 | 2.56 | 2.72 | | |
| Calc. Newtonian Velocity To Initial Error | 0.000 | 0.000 | 0.000 | 0.000 | 0.000 | 0.000 | 0.000 | 0.000 | 0.000 | 0.000 | 0.000 | | |
| Friction Velocity, $V_f$ (m/s) | 0.0735 | 0.0740 | 0.0744 | 0.0749 | 0.0753 | 0.0757 | 0.0761 | 0.0765 | 0.0769 | 0.0773 | 0.0776 | | |
| Turbulent Bulk Velocity, $V_{turb}$ (m/s) | 1.44 | 1.59 | 1.73 | 1.88 | 2.02 | 2.16 | 2.31 | 2.45 | 2.60 | 2.74 | 2.88 | | |
| Turbulent To Bulk Flow Error (m/s) | 0.00 | 0.00 | 0.00 | 0.00 | 0.00 | 0.00 | 0.00 | 0.00 | 0.00 | 0.00 | 0.00 | | |
| Flow Regime Analysis | | | | | | | | | | | | | |
| Flow Regime | Laminar | Laminar | Turbulent | Turbulent | Turbulent | Turbulent | Turbulent | Turbulent | Turbulent | Turbulent | Turbulent | | |
| Actual Effective Viscosity, $\mu_{eff}$ (Pas) | 0.0602 | 0.0575 | 0.0407 | 0.0302 | 0.0249 | 0.0219 | 0.0201 | 0.0188 | 0.0179 | 0.0172 | 0.0167 | | |
| Actual Bingham Reynolds Number (Re) | 8311 | 9560 | 10901 | 17011 | 23415 | 29588 | 35446 | 41022 | 46369 | 51529 | 56538 | | |
| Actual Wall Stress (Pa) | 7.57 | 7.66 | 8.70 | 10.37 | 12.33 | 14.43 | 16.62 | 18.90 | 21.26 | 23.70 | 26.23 | | |

Note:
To run iteration macro, use CTRL+SHIFT+R
Lavender cells are the cells set to zero in the Goal Seek iterations
Yellow cells are the cells varied in the Goal Seek iterations The typical output from the MFT flow regime model can be seen in FIG. 8. This figure is generated by plotting the Bingham Reynolds Number versus the MFT flow rate. The output seen is dependent on the MFT rheology. The rheological properties of MFT can fluctuate during operation. It can be seen below that for the specific case of 1.42 SG MFT, there is a sensitive region around 300-400 m$^3$/hr where the flow regime is in the laminar to turbulent transition zone.

As mentioned previously, fluctuations in MFT rheology can result in operating within the laminar or transitional flow regime. Operating in the laminar or transitional flow regime may significantly affect how the flocculating agent is initially introduced into the MFT. While the flow travelling through a 6 inch flocculant solution injector may be turbulent at all flow cases, the MFT and the flocculating agent may immediately exit the injector back into a 12" pipe which may be composed of High Density Polyethylene (HDPE). Upon expanding into this size of pipe, the flow regime at this time may in fact return to the laminar or transitional zone and inhibit the early stages of flocculating agent dispersion. This can have negative effects on how much water will be released during the flocculation and dewatering process.

Figure 8:
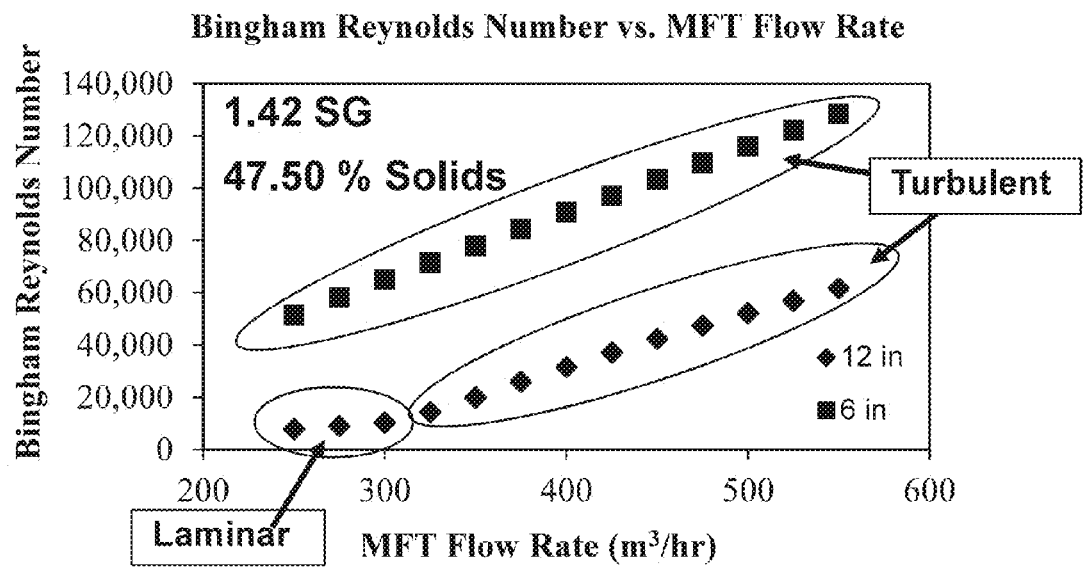
FIG. 8 represents a flow regime model output for MFT.

FIG. 8 also shows that there is preferably a minimum MFT flow rate around 400 m$^3$/hr that is able to achieve effective flocculating agent dispersion for this pipeline and injector configuration.

Figure 9:
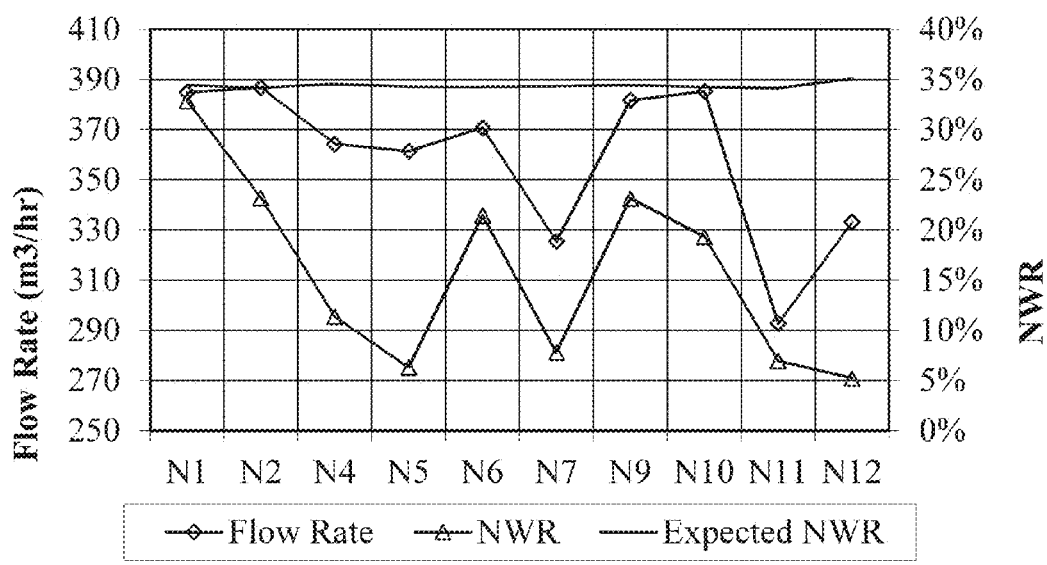
FIG. 9 represents average mature fine tailings flow rates and net water release for a MFT.

As seen from FIG. 9, the MFT flow regime model suggests that there is a sensitive region near 300-400 m$^3$/hr for this pipeline and injector configuration. FIG. 9 shows field data from certain dewatering operations during the course of an operating season. FIG. 9 shows a correlation between the MFT flow rate and the NWR. At lower flow rates the NWR was more sporadic and tended to be worse than at greater flows. As the MFT flow rates decrease, so does the NWR results from those operations. It can be seen that the newer water release results fluctuate in between the 300-350 m$^3$/hr zone. This directly supports the results from the MFT flow regime model and the minimum flow observations.

Figure 10:
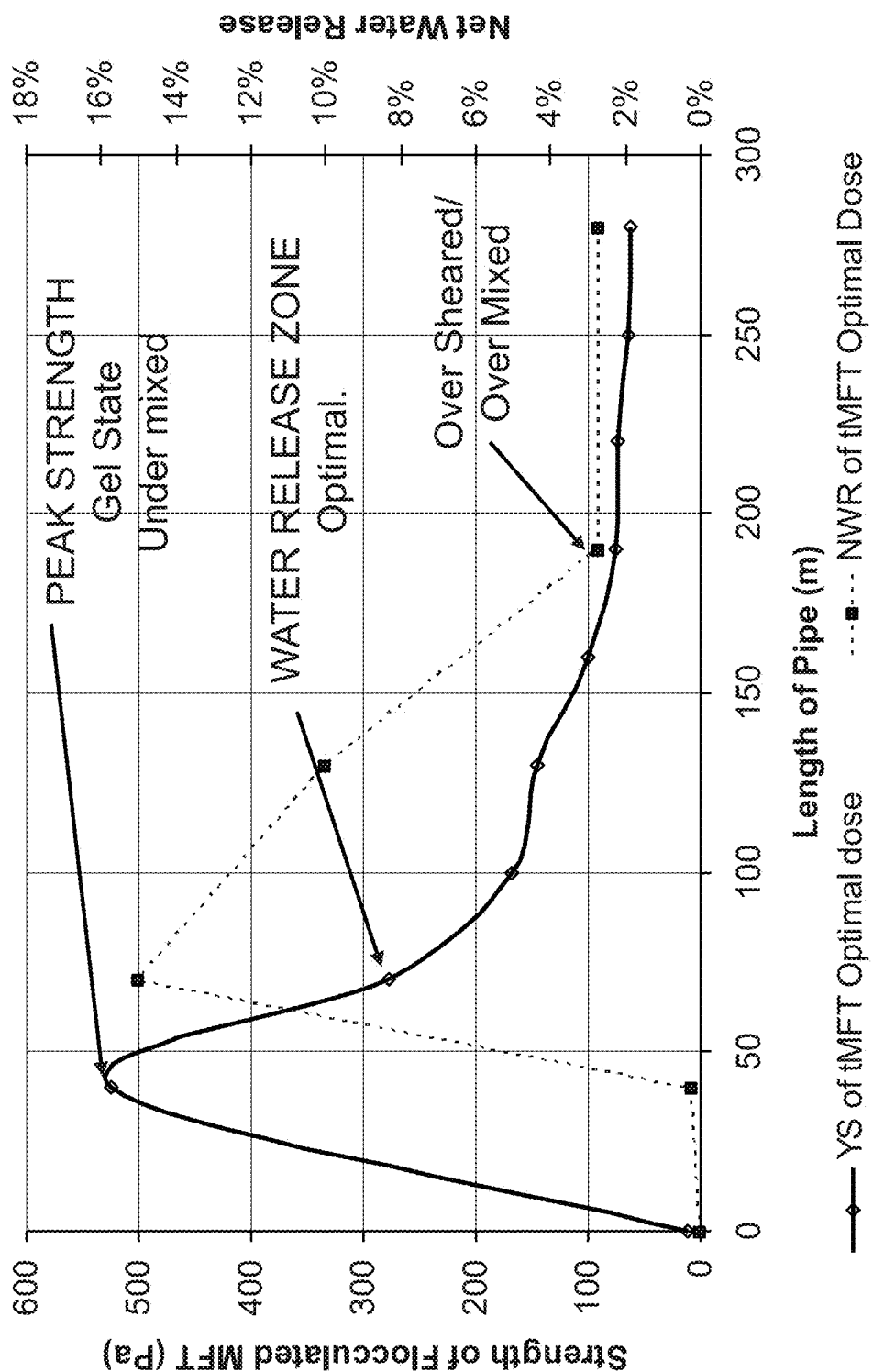
FIG. 10 represents variations of net water release and strength of flocculated MFT versus the length of a pipeline.

Also, as seen from FIG. 10, the length of the pipeline between the injector 9 and the outlets may affect the NWR. More particularly, it appears that in some implementations, a pipe length of less than 100 meters is advantageous to obtain a reliable NWR upon deposition for this pipeline and injector configuration.

Turbulent Flow Regime Operation

As mentioned further above, a turbulent flow regime may be provided to inhibit process oscillations. In some implementations, a turbulent flow regime is provided for the thick fine tailings feed entering the flocculant addition point as well as for the flocculating tailings material in a section of the floc build-up pipeline. The turbulent section of the floc build-up pipeline may have a smaller diameter compared to the downstream pipeline and/or the flow rate of the material may be provided so as to achieve the turbulence when the section has the same diameter as the downstream pipeline. In some implementations, the turbulent section of the pipeline has a sufficient length so as to ensure dispersion and initial floc build-up. It should be noted that pipeline may also be coiffured such that when flocculated material reaches a peak yield stress it transitions to a laminar flow regime and is thereafter transported within the pipeline in a laminar flow regime to the dewatering unit (e.g., deposition site).

In some implementations, a turbulent flow regime is provided such that the thick fine tailings feed has a Bingham Reynolds Number of at least 40,000. The Bingham Reynolds Number may be at least 45,000, at least 50,000, at least 55,000 or at least 60,000. The Bingham Reynolds Number may be provided between 40,000 and 65,000; between 45,000 and 60,000; or between 50,000 and 55,000, for example. It should be noted that operation within other Bingham Reynolds Number ranges or other Reynolds Number ranges that ensure a turbulent flow regime in the dispersion stage and the beginning of the floc build-up stage may be performed depending on the particularities of the system.

In some implementations, the turbulent flow regime is provided such that the thick fine tailings feed has sufficiently high turbulence to enable good dispersion of the flocculant, and below a maximum threshold that would induce the high yield stress flocculated tailings material to also have a turbulent flow regime. For example, the flow rate of the thick fine tailings feed may ensure turbulence in the feed and the dispersion stage, while ensuring that the flocculated tailings material is not turbulent or has a laminar flow regime below the laminar-turbulent transition zone for the high yield stress flocculated material. Providing a laminar flow regime for the flocculated material can facilitate process control, particularly the shear conditioning stage to achieve the water release zone upon deposition of the conditioned flocculated tailings material. The turbulent flow regime of the feed thick fine tailings may be enabled by controlling the feed flow rate, the feed pipe diameter and/or the feed fluid properties, while the laminar or non-turbulent flow regime of the flocculated material may be enabled by controlling the feed flow rate and/or configuring the downstream pipe to have a sufficiently large diameter, for example.

Implementations for Reducing Oscillations in Backpressure and Flocculant Dosage

As mentioned above, it had been observed that the commercial scale up of a pilot MFT dewatering system was experiencing issues related to some oscillations in the quality of the treated MFT that was deposited into the deposition cells.

It was determined that the design and operation of the conditioning pipeline (also referred to herein as the "header") transporting the flocculating MFT from the flocculant addition to the deposition cell was one of the factors leading to oscillations in the quality of the deposited material. As will be explained below, by modifying the header of the system the oscillations were reduced without requiring extensive modifications to operations or other process equipment.

Figure 11:
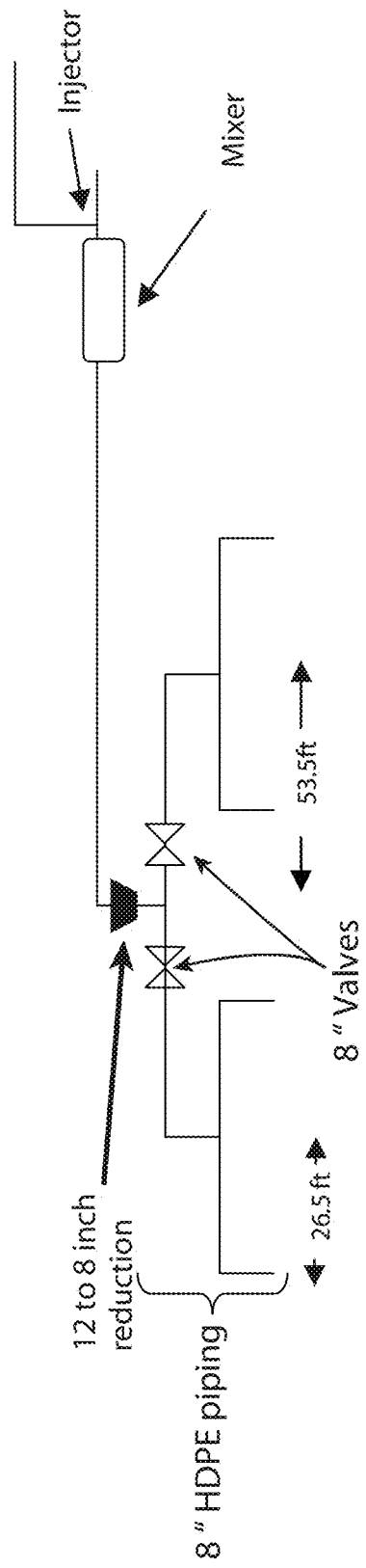
FIG. 11 represents an initial header design.
Figure 12:
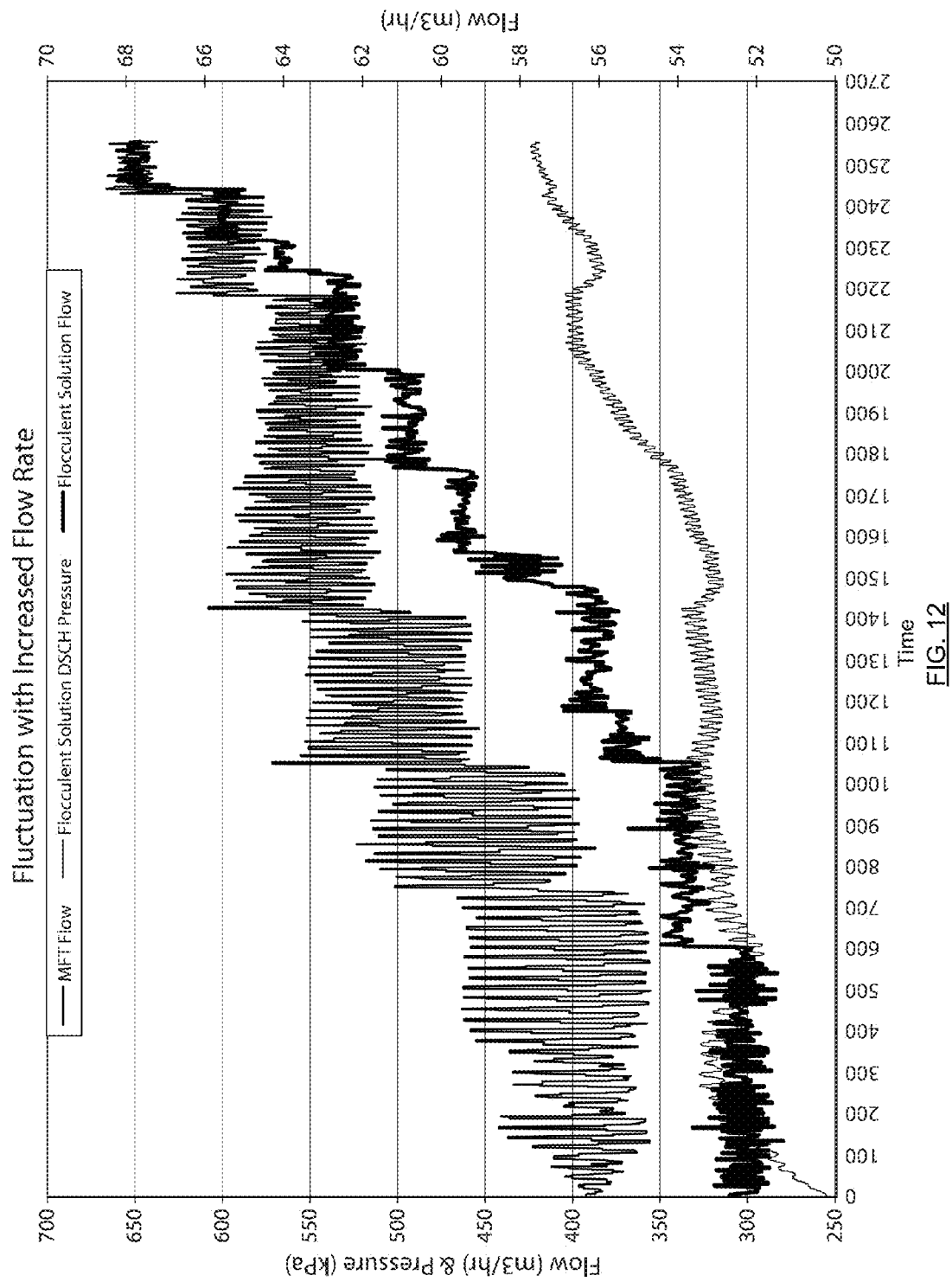
FIG. 12 represents oscillations of process variables of MFT flow, flocculant solution discharge pressure and flocculant solution flow.

FIG. 11 represents an initial header design. The oscillations in product quality were observed especially when approaching optimal polymer dose. The oscillation issue appeared to affect many of the dewatering systems. During the oscillations, the deposited material could be observed to change through various levels of quality. Along with the quality fluctuations, a similar oscillatory behaviour was observed on process variables such as flows and pressures. For instance, FIG. 12 shows oscillations of process variables of MFT flow, flocculant solution discharge pressure and flocculant solution flow.

A number of possible causes of the quality oscillations were investigated. Quality of the deposited flocculated material has a significant impact on the overall drying paradigm in that material that releases water quickly upon deposition results in overall acceleration of the dewatering and drying operation.

It was found that the configuration of the deposition headers in combination with the other equipment and operating parameters for the dewatering process described further above (e.g., pumps at maximum capacity and not flow rate controlled, flocculant on ratio control, and so on) was leading to backpressure oscillations and other oscillations in the process.

"Backpressure" may refer to the resistance to the movement of a fluid. Backpressure may be caused by obstructions, restrictions, pipeline bends or transitions. The term "backpressure" should be generally understood as resistance to flow. In the context of substantially incompressible fluids flowing through rigid pipes, as in the present case, a reduction in flow rate at a constricted point means that the flow is "backed up" all the way to the start of the pipe.

As will be understood, in the present case the piping configuration is typically not changing in the sense that there is a header assembly that is constructed for a given dewatering facility to transfer and condition the flocculating tailings from a flocculant addition point to a deposition cell. However, the rheological properties of the flocculating fluid inside the header assembly are changing which, in turn, changes the amount of flow resistance generated by the fluid's interaction with obstructions, restrictions, bends and the like.

Figure 13:
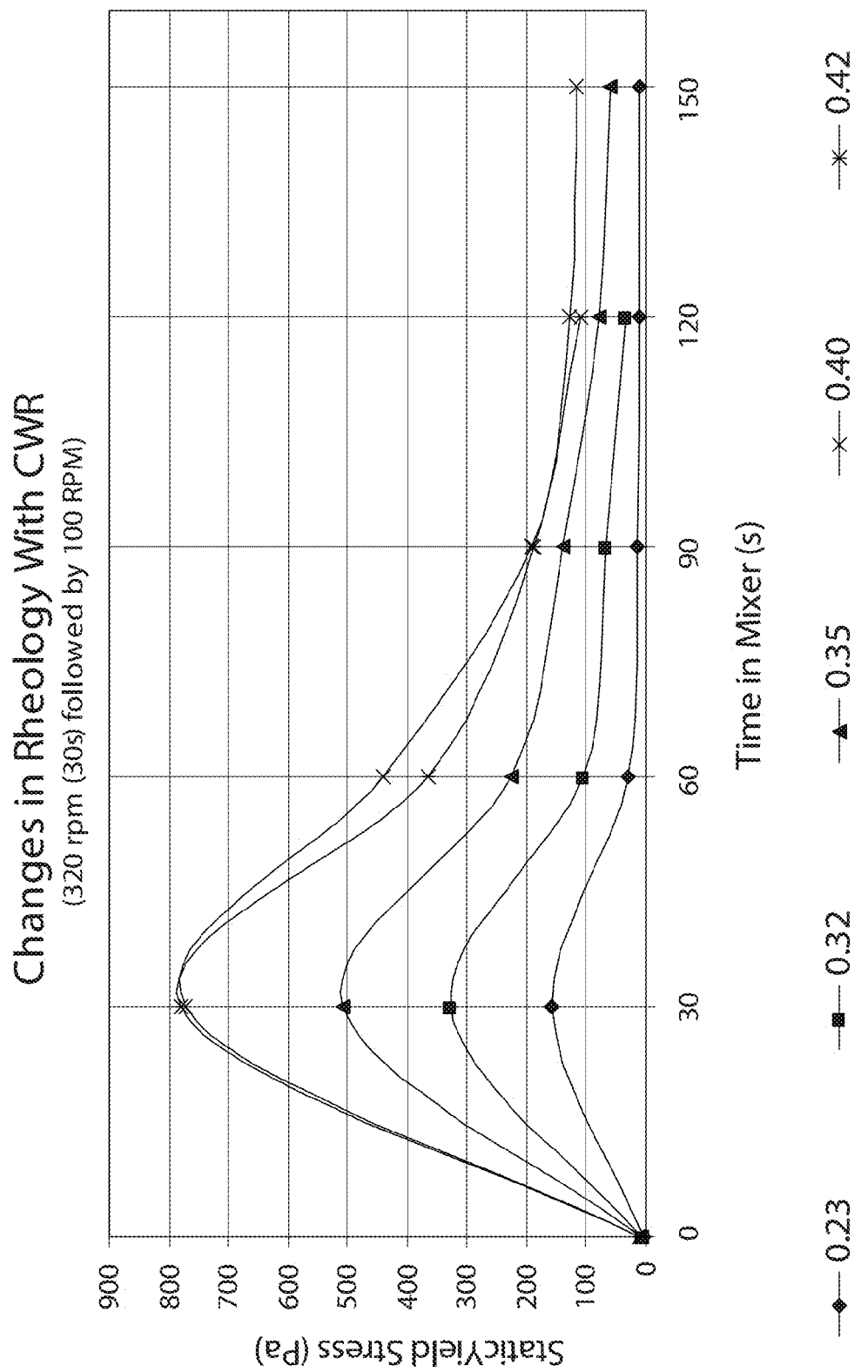
FIG. 13 represents visual depiction of flocculation process as mixing and conditioning occur over time with varying clay to water ratios.

Hence, to maintain a substantially constant flow, the pressure must be increased or decreased to account for the changes in flow resistance depending on the changing rheology. The change in rheology occurs as a result of the flocculation process when the flocculant is added to the MFT. As the flocs begin the form and build up, the static yield stress of the fluid increases, e.g., up to a maximum value at which point continued shear conditioning begins to thin the fluid, lowering the static yield stress. FIG. 13 provides visual depiction of flocculation process as mixing and conditioning occur over time with varying clay to water ratios.

Figure 14:
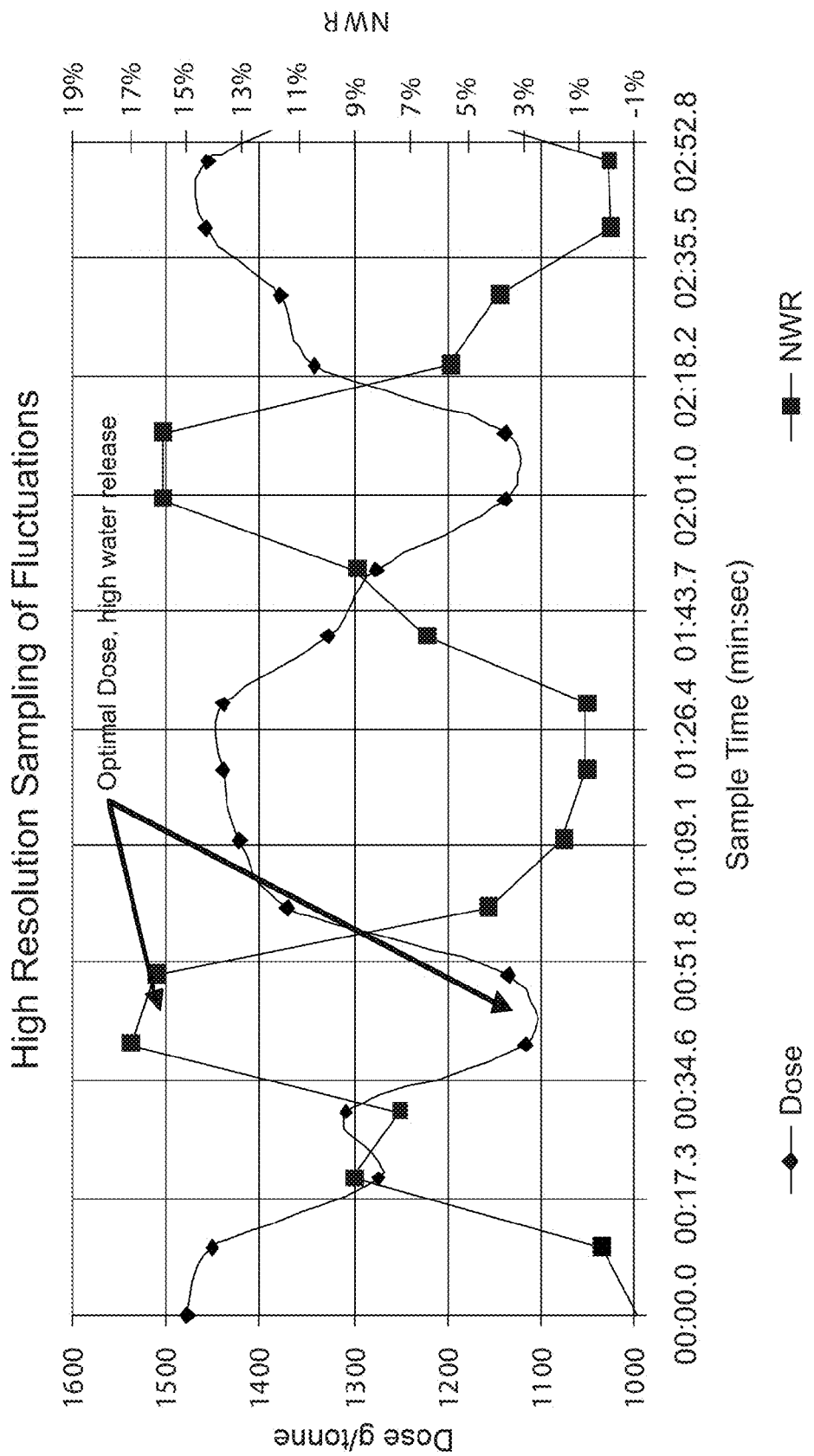
FIG. 14 represents an oscillating flocculant dose when sampled at very short intervals.

FIG. 14 shows the oscillating flocculant dose when sampled at very short intervals. It can be seen that there are flocculant dosage spikes above the optimal dose. This overdosing is due to oscillatory spikes in the MFT flow rate which, in turn, are due to back pressure spikes as explained further above.

A modified header was provided in order to reduce the backpressure of the given dewatering system. The header configuration was modified on two of the deposition cells. The modified header included increased pipe size (50% increase in pipe diameter from 8 inches to 12 inches). Another modified header may include two splits and have a 12 inch diameter. The modified header configurations reduced the backpressure of the high yield stress treated MFT (tMFT) at optimal dose, and provided improved operations in terms of helping to inhibit oscillations.

Figure 15:
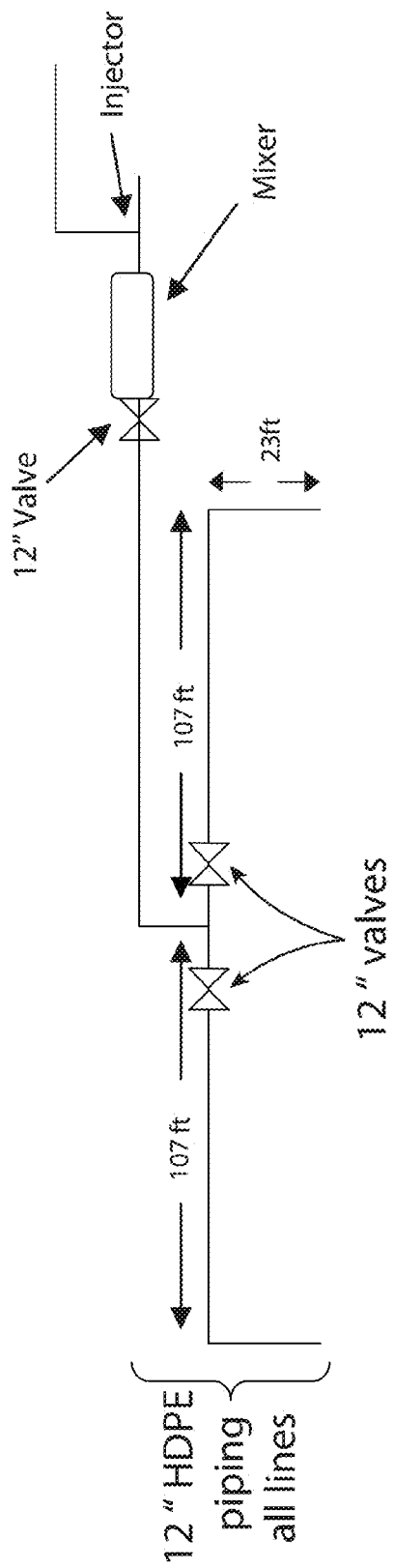
FIG. 15 represents an example of a modified header.
Figure 16:
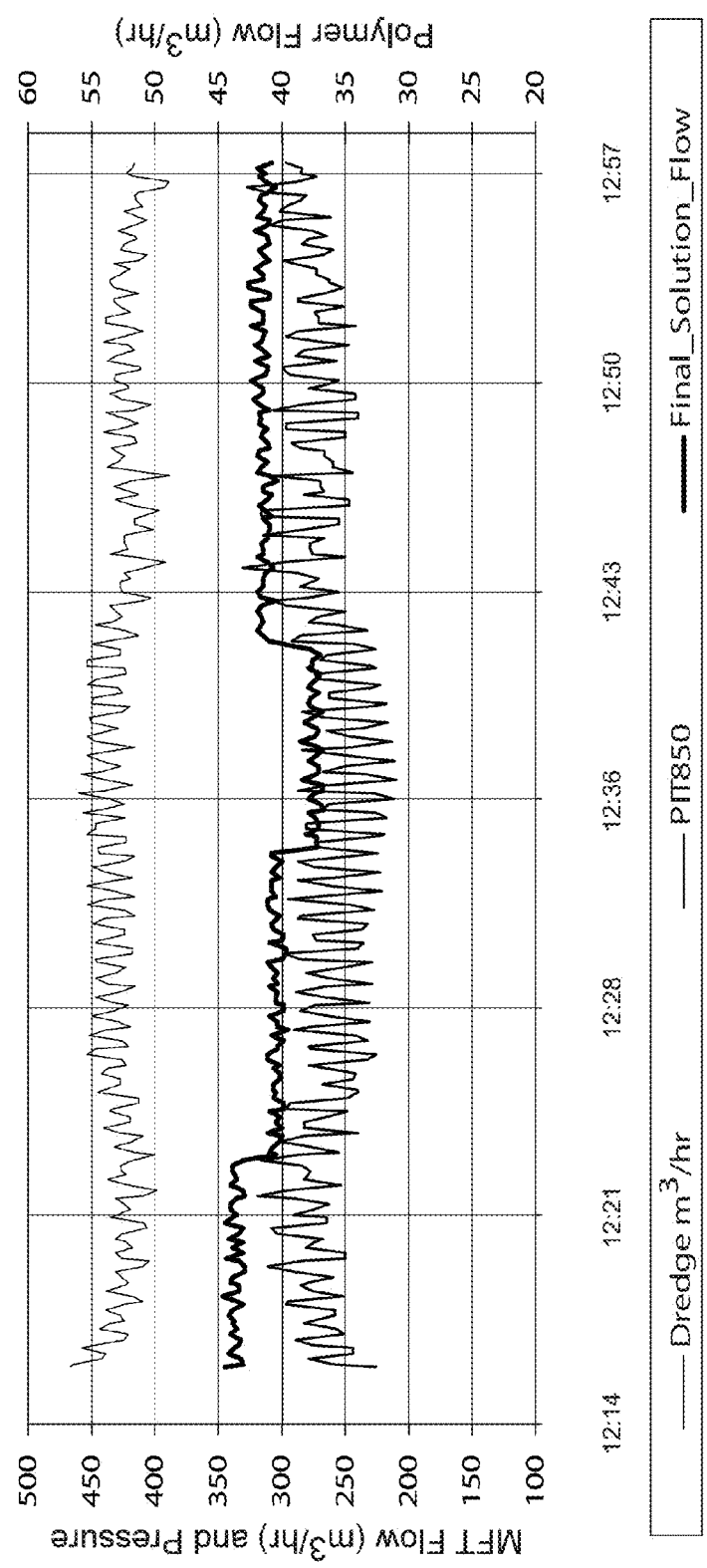
FIGS. 16 and 17 represent that the modified header configuration with less restrictions and lower backpressure swing susceptibility, leads to significantly lower or attenuated flow oscillations of the streams of the dewatering system compared to the former header.
Figure 17:
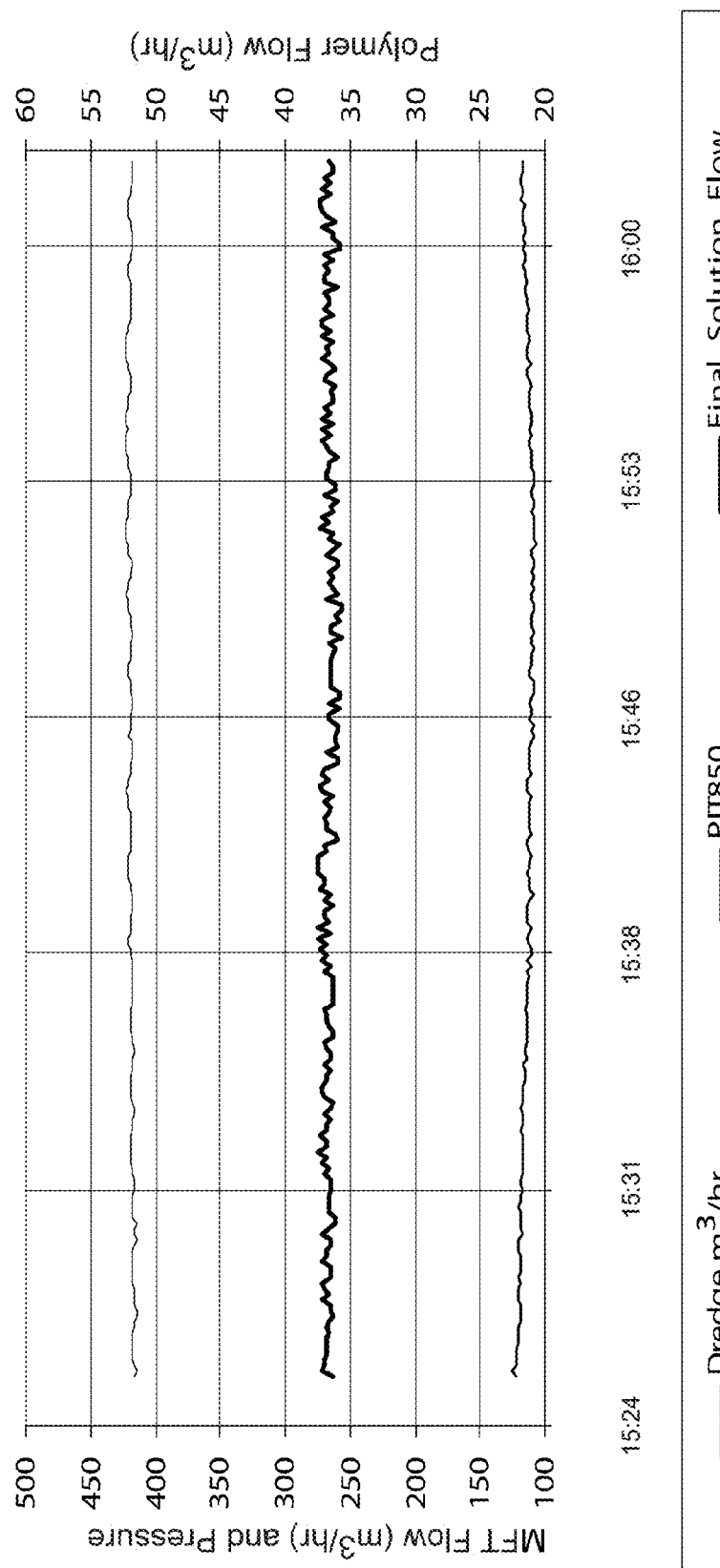

FIG. 15 shows an example of the modified header. Upon switching to the modified header configuration, an immediate noticeable difference was observed in overall dewatering performance and process stability. The impact on process control and stability may be appreciated from a comparison of the process trends illustrated in FIGS. 16 and 17. In FIGS. 16 and 17, the three lines are respectively referring to the MFT flow, the flocculant flow, and the flocculant solution pressure (PIT850).

FIGS. 16 and 17 show that the modified header configuration with less restrictions and lower backpressure, lead to significantly lower or attenuated flow oscillations of the streams of the dewatering system compared to the former header. FIGS. 16 and 17 not only show that the MFT flow is significantly more stable with the new header configuration, but also that the discharge pressure of the flocculant solution preparation unit was lower and more stable.

Figure 18:
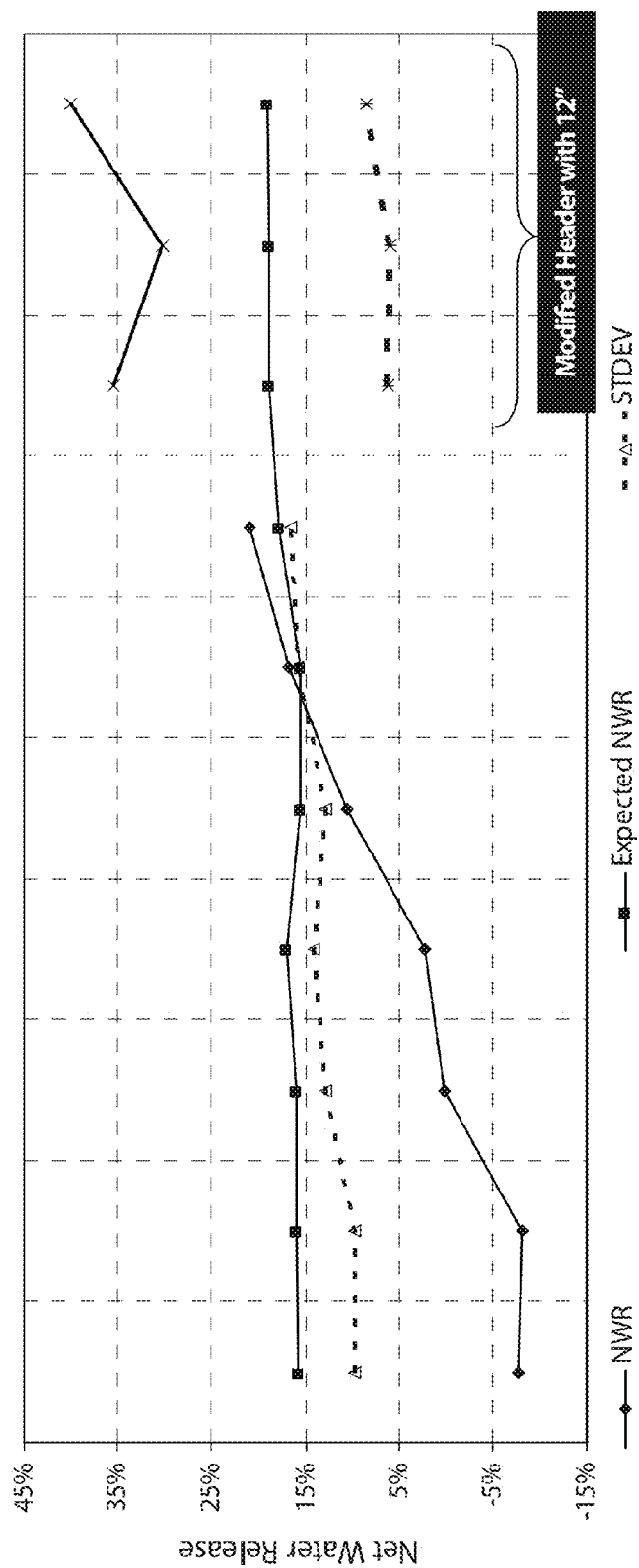
FIG. 18 represents notable benefits in the Net Water Release (NWR) using the modified header configuration.

In addition, referring to FIG. 18, there were notable benefits in the Net Water Release (NWR) using the modified header configuration. The NWR results with the modified header setup were consistently in the range of 30-40% for the entire period of testing with a much lower standard deviation than results using the previous design.

In some implementations, the conditioning pipeline assembly that transports the treated MFT to the deposition cells may be configured and operated for inhibiting fluid oscillations, thereby stabilising the system and obtaining more consistent quality material for dewatering. The conditioning pipeline assembly may be configured, for example, by removing or reducing pipe restrictions, pipe divisions, obstructions, and the like.

In some implementations, a conditioning pipeline assembly may be configured and operated in connection with a centrifugal pump that is providing the hydraulic energy for MFT flow and/or flocculant solution flow. It may be advantageous to implement a pipeline design with header as describe above to reduce backpressure oscillations when using a centrifugal pump to displace the MFT, since the MFT flow would not be flow rate controlled.

In some other implementations, a positive displacement pump may be used for providing the hydraulic energy for MFT flow and/or flocculant solution flow. The positive displacement pump can deliver constant flow regardless of changes in downstream pressure and resistance to flow. Utilization of positive displacement pumps may therefore enable improved stabilization for various different configurations of the conditioning pipeline assembly.

A marked reduction in flocculant dose (in the region of 10-20%) was also observed along with a reduced demand on the flocculant preparation unit due to lower pressure required for injection. Thus, in addition to the potential for increased dewatering rate and dried material production, there may also be reduced flocculant dose on average per unit of MFT. While the flocculant reduction amount may vary depending on the properties of the MFT and operating conditions, and the reduction in dose may be relatively small on a per unit basis, the accumulation of this flocculant reduction over the course of a full dewatering season may prove to be a significant savings in flocculant cost.

Achieving stable and consistent quality flocculated material can lead to significant improvements in the overall dewatering and drying times and dried material production rates. In some scenarios, reduction of fluid related oscillations, examples of which are described herein, may provide up to two to four times improvement on dried material production rates.

Furthermore, operation of the dewatering system with increased stability may provide a number of advantages, such as allowing effective and more reliable automation of the system conditions, leading to less operator involvement and reduced equipment alarms or adjustments. In addition, the demand and wear on equipment may also be also reduced, e.g. the flocculant solution preparation unit has lower pressure demands on it since pressure required for injection of the flocculant solution is lower, requiring less flow. This can also allow for operation at higher rates as there may be more room to operate below upper limits.

Providing MFT Flow Rate Above Minimum Threshold

It was also found that for a given dewatering system (which may include MFT properties such as density and clay-to-water ratio (CWR), conditioning pipeline assembly or header configuration including pipe size and length, polymer flocculant, and so on) there appears to be a minimum MFT flow rate for providing sufficient line pressure and turbulent dispersion of the flocculant into the MFT, for stable operation within an optimum flocculant dose range.

Figure 19:
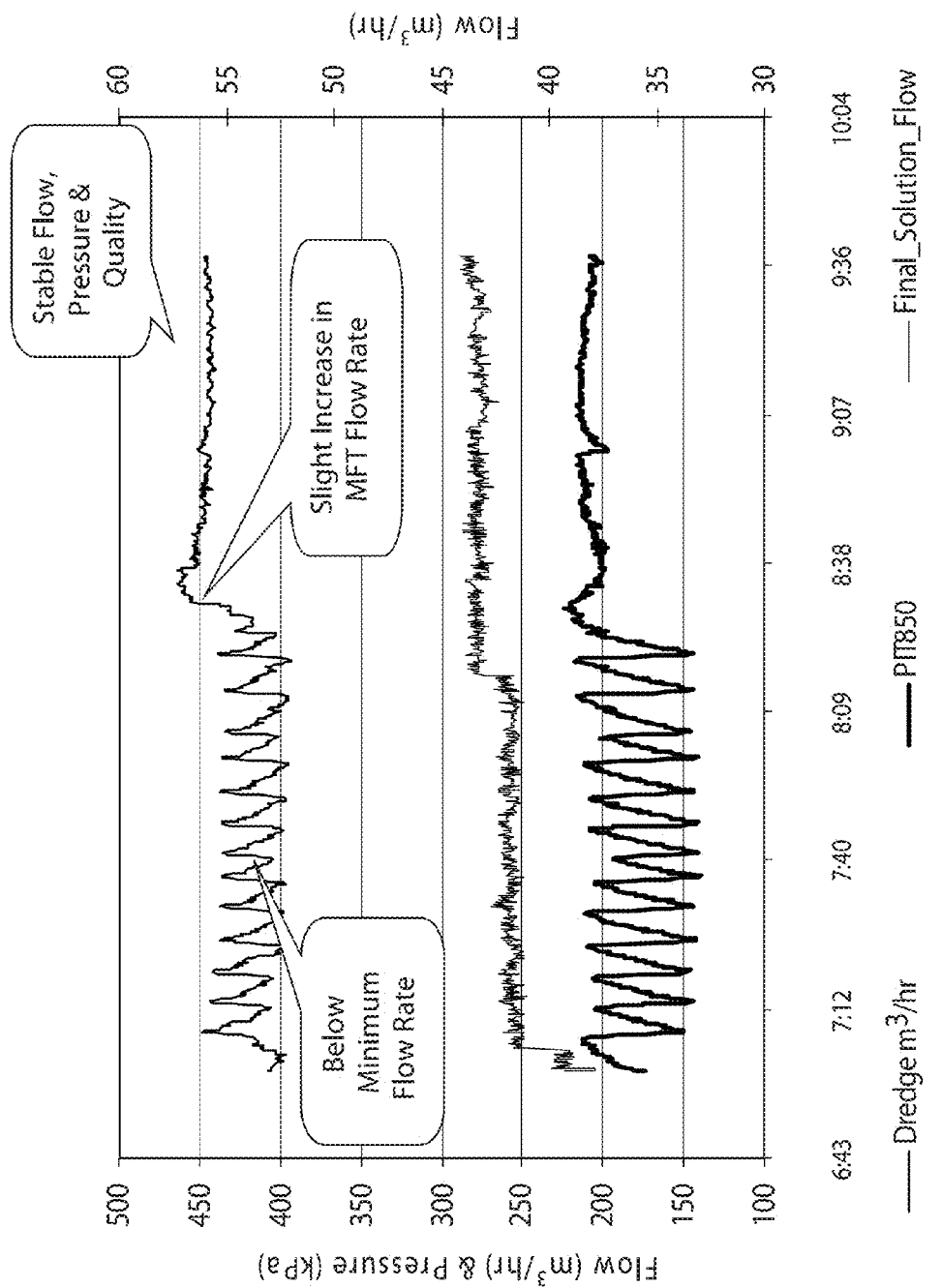
FIG. 19 represents when the flow rate of the MFT is below a minimum threshold, the system can experience significantly higher oscillations.

Referring to FIG. 19, when the flow rate of the MFT is below a minimum threshold, the system can experience significantly higher oscillations, particularly with regard to the MFT flow rate and the flocculant solution pressure. PIT850 represents the flocculant solution pressure in kPa. If operating below the minimum flow rate and/or line pressure, the oscillations may still occur and may be quite pronounced in some cases. However, with only a slight increase in flow rate above the minimum threshold, as can be seen in between time intervals 4 and 5 on FIG. 19, the stability can be dramatically increased as the flow rate and pressure oscillations are attenuated. On FIG. 19, the left Y axis refers to the flow rate of MFT and pressure of the flocculating agent (i.e., polymer flocculant), and the right Y axis refers to the flowrate flocculating agent (i.e., polymer) flow rate. It should be noted that the process may be controlled or the pipeline may be designed such that the reduction in process oscillations are similar or at least as great as the reductions illustrated in FIG. 19.

Figure 20:
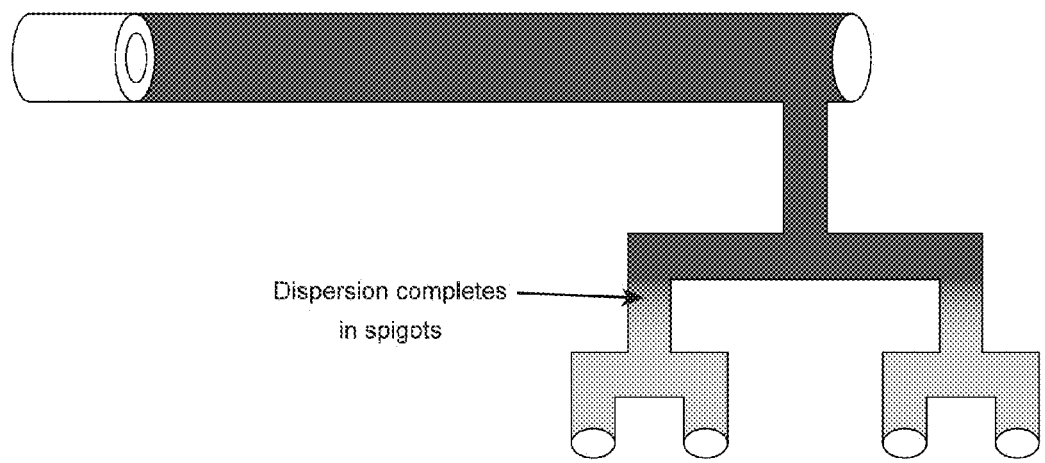
FIG. 20 represents that below a minimum flow rate, the dispersion of the flocculant into the MFT may not complete sufficiently in the proximate section of the pipeline, but rather completes further down the pipeline.

In some scenarios, if the MFT flow rate is below the minimum threshold, inadequate dispersion of the flocculant into the MFT in the line section proximate the flocculant addition point can cause downstream upsets. Referring to FIG. 20, below the minimum flow rate, the dispersion of the flocculant into the MFT may not complete sufficiently in the proximate section of the pipeline, but rather completes further down the pipeline at locations where there may be bends, restrictions, pipe splits, and so on. In this situation, there are various drawbacks, which may include deposition of gel like material with little dewatering capacity due to inadequate conditioning to reach the water release stage, variation in the flocculation material that is deposited out of each spigot due to inadequate dispersion at upstream splits, and/or flow fluctuations.

Figure 21:
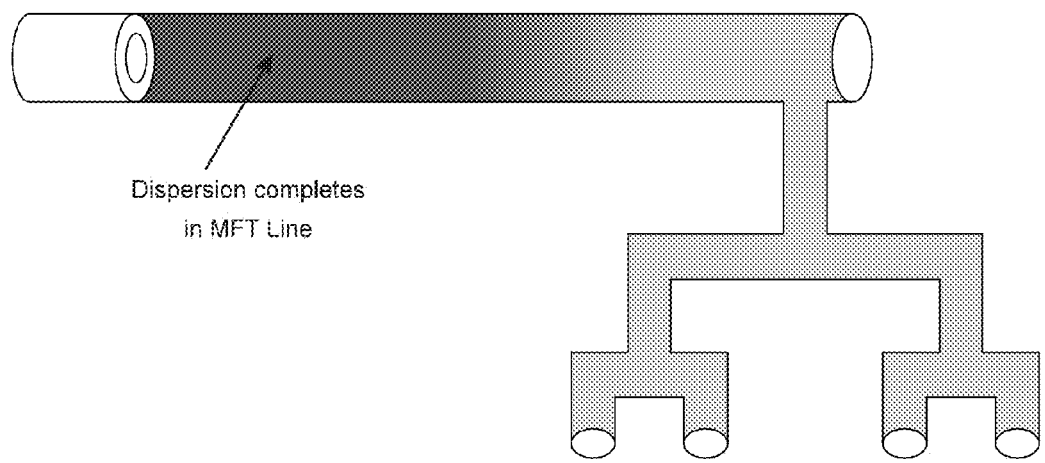
FIG. 21 illustrates that at a minimum flow rate threshold, the MFT turbulence facilitates dispersion to occur in the pipeline section proximate to the flocculant addition point.

By operating above the minimum flow rate threshold, the MFT turbulence facilitates dispersion to occur in the pipeline section proximate to the flocculant addition point, as illustrated in FIG. 21. In such a scenario, the flocculant can be well dispersed into the MFT in the main transportation section of the pipeline, rather than in any downstream branches, restriction, spigots or the like. The dispersion stage of the process thus has enough time in the upstream section of the pipeline to complete and enter the water release stage prior to downstream branches, restrictions, spigots or the like. In addition, flow fluctuations may be reduced or eliminated.

In some implementations, the MFT may thus be provided with a flow rate above a minimum threshold, sufficient to provide turbulence to promote proper and stable flocculant dispersion into the MFT.

The configuration and operation of the conditioning pipeline assembly may also occur in conjunction with ascertaining and providing the minimum threshold of the MFT flow rate, in order to further promote attenuation of oscillations to achieve increased stability and performance of the dewatering operation.

Air Removal from Flocculant Solution

It was also observed that air in the flocculant solution can negatively impact the dewatering operations.

Air in a pressurized operating pipeline may originate from certain sources. First, prior to start-up, the line may be empty (full of air) and to entirely fill a pipeline with fluid, it is necessary to displace this air. As the line fills, much of this air will be pushed downstream, but an amount will become trapped at pipeline or system high points. In addition, air can be entrained during contacting of dry polymer flocculant with water during polymer flocculant makedown. Dry polymer flocculant is delivered from a hopper to an atmospheric contacting chamber where water is added to the polymer flocculant in what may be called a Polymer Sluicing unit (PSU). The PSU rotates to improve water/polymer contact and can form a funnel like flow from the PSU into the process piping. Also, because the polymer flocculant solution may be viscous, agitation of polymer flocculant and water in the PSU can entrain air. Liquid polymer flocculant solution is routed to a mix tank were entrained air is slow to exit the solution due to the high viscosity. The polymer flocculant solution leaving the mixing tank is further diluted to a final concentration for transport and injection into the MFT. Remaining entrained air in the polymer flocculant solution that was not released in the mixing tank, will further release from solution during the dilution step (which further lowers the viscosity of the polymer flocculant) and during transport and agitation in the pipeline. This can continuously add air pockets to the piping system. A pressurized pipeline is typically never without air and sometimes the volume can be substantial.

It was found that the issue of air in the flocculant solution may contribute to oscillations in the flocculated tailings quality among other drawbacks.

Two actions were taken to assess air removal from the flocculant solution and the pipeline. The first was to install multiple vent points on the line to release as much air as possible during operation and the charging of the line. Secondly, the polymer mother solution concentration was to be lowered to 1% in order to reduce its viscosity and encourage more air to be released in the preparation unit, e.g. in the mix tanks prior to final dilution.

A change in flocculant mother solution concentration was made to remove more of the air entrained in the polymer. The change in concentration from 1.5% to 1% by weight reduces the viscosity of the polymer solution allowing air to be liberated more readily in the upstream mixing tanks. The pipeline was also vented during line charging and at random times during the day to release any built up air pockets.

It was found that the flocculant solution flow at the injector showed a marked improvement, for example in terms of the stability of the polymer solution flow through the injector. A more stable flow across the injector was recorded via a portable flow meter.

Figure 22:
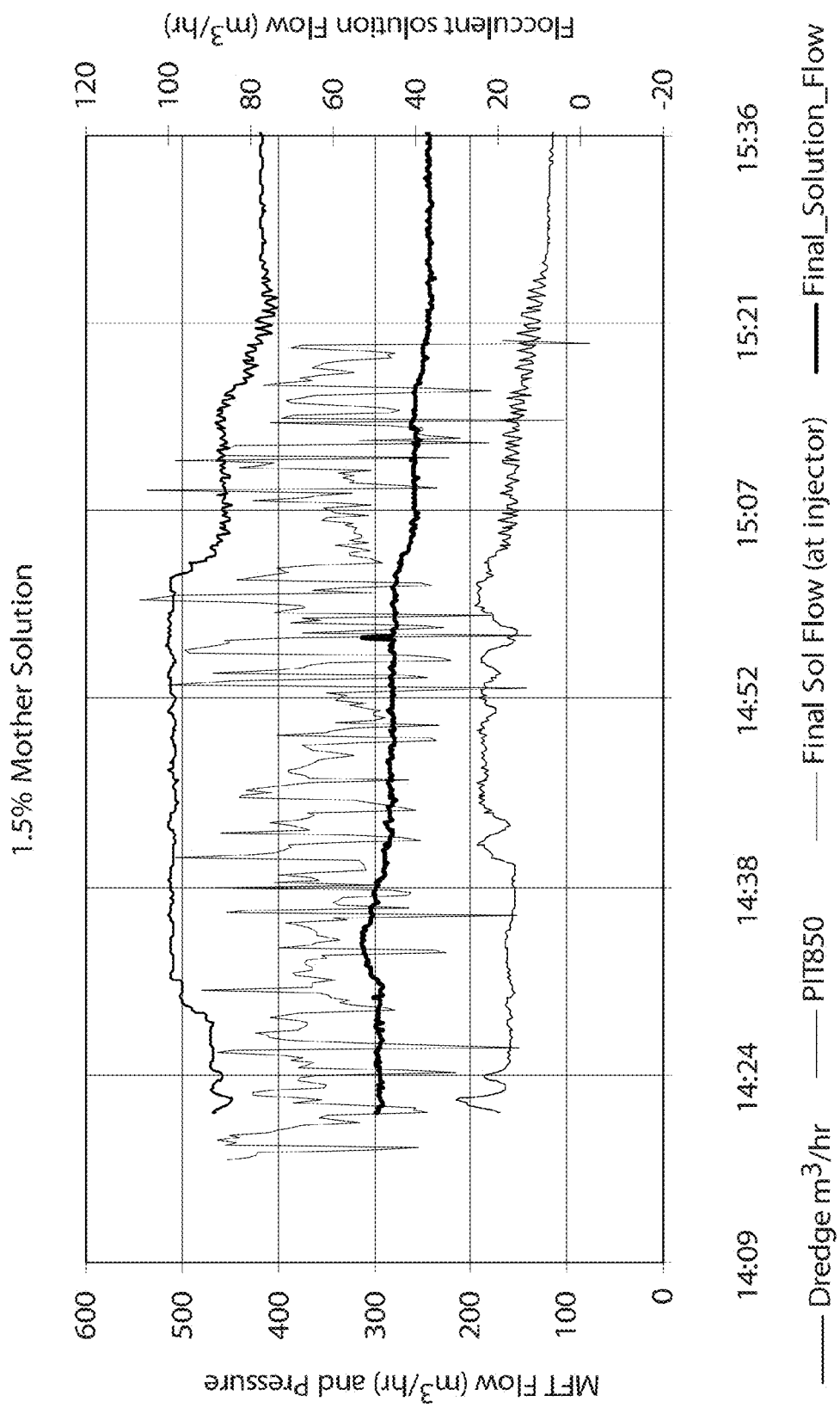
FIGS. 22 and 23 illustrate various flow parameters are shown for the 1.5% and 1% flocculant solutions.
Figure 23:
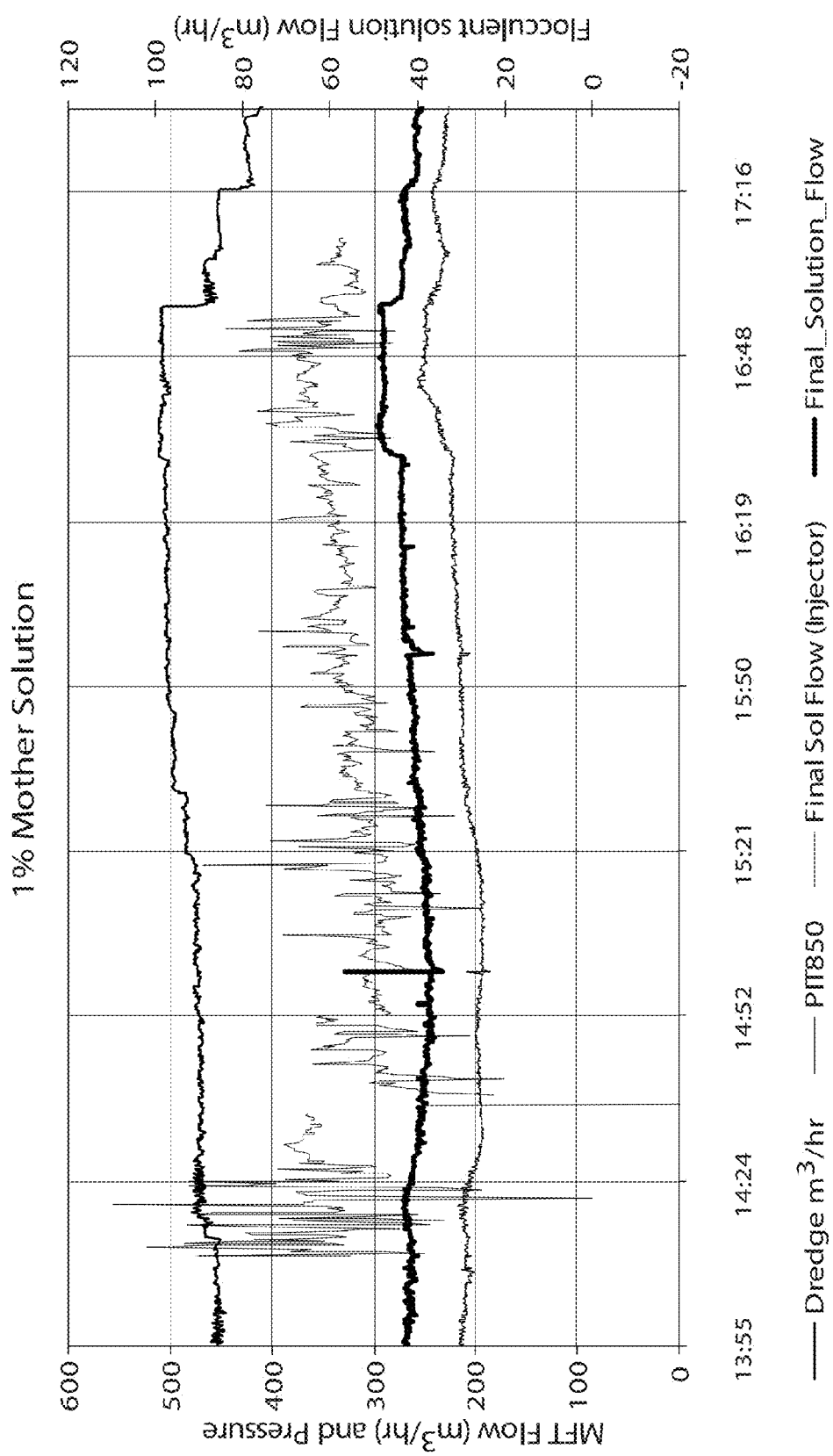

Referring to FIGS. 22 and 23, various flow parameters are shown for the 1.5% and 1% flocculant solutions. The 1% final flocculant solution has flow oscillations that are attenuated compared those of the 1.5% solution, thus providing increased injection flow stability.

It is understood that above implementations, aspects and embodiments are for illustrative purposes only and that various modifications or changes in light thereof will be suggested to persons skilled in the art and are to be included within the present invention.

The invention claimed is:

1. A method of treating thick fine tailings, comprising:
providing an in-line flow of the thick fine tailings;
adding a flocculant into the in-line flow of the thick fine tailings to produce an in-line flow of flocculating tailings material, wherein the in-line flow of the thick fine tailings has a turbulent flow regime upon addition of the flocculant;
shearing the in-line flow of the flocculating tailings material to induce floc build-up, increase a yield stress thereof and reduce turbulence thereof, to thereby produce a non-turbulent, in-line flow of flocculated material;

subjecting the in-line flow of the flocculated material to shear conditioning to decrease the yield stress thereof and produce a conditioned flocculated tailings material that is within a water release zone wherein water separates from the conditioned flocculated tailings material; and dewatering the conditioned flocculated tailings material.

2. The method of claim 1, wherein the in-line flow of the thick fine tailings has a Bingham Reynolds Number of at least 40,000 upon addition of the flocculant.

3. The method of claim 1, wherein the in-line flow of the thick fine tailings has a Bingham Reynolds Number of at least 50,000 upon addition of the flocculant.

4. The method of claim 1, wherein the in-line flow of the thick fine tailings has a Bingham Reynolds Number of at least 60,000 upon addition of the flocculant.

5. The method of claim 1, wherein the in-line flow of the thick fine tailings has a Bingham Reynolds Number of between 40,000 and 65,000 upon addition of the flocculant.

6. The method of claim 1, wherein the flow of the thick fine tailings has a Bingham Reynolds Number of between 45,000 and 60,000 upon addition of the flocculant.

7. The method of claim 1, wherein providing the turbulent flow regime comprises regulating a feed flow rate of the thick fine tailings above a minimum threshold.

8. The method of claim 1, wherein providing the turbulent flow regime comprises configuring a pipeline assembly that transports the flow of thick fine tailings for addition of the flocculant and transports the flocculating tailings after addition of the flocculant, to have a sufficiently small pipe diameter.

9. The method of claim 1, wherein providing the turbulent flow regime comprises ensuring a sufficiently low viscosity of the in-line flow of the thick fine tailings upon addition, of the flocculant.

10. The method of claim 1, wherein the non-turbulent in-line flow of flocculated material has a laminar flow regime.

11. The method of claim 1, wherein the in-line flow of the thick fine tailings is provided by pumping at a substantially constant flow rate.

12. The method of claim 1, wherein the in-line flow of the thick fine tailings is provided by pumping at substantially constant rotations per minute.

13. The method of claim 1, wherein the adding of the flocculant comprises injecting a solution comprising the flocculant into the in-line flow of the thick fine tailings.

14. The method of claim 13, wherein the adding of the flocculant is performed by ratio control with respect to the in-line flow of the thick fine tailings.

15. The method of claim 1, wherein the dewatering comprises depositing the conditioned flocculated tailings material onto a sub-aerial deposition site.

16. The method of claim 1, wherein the dewatering comprises subjecting the conditioned flocculated tailings material to thickening and/or filtering.

17. A method of dispersing a flocculant into an in-line flow of thick fine tailings, comprising:
providing the in-line flow of the thick fine tailings with a turbulent flow regime to provide a turbulent feed;
adding the flocculant into the turbulent feed to produce an in-line turbulent flow of flocculating tailings material;
shearing the in-line turbulent flow of the flocculating tailings material to induce floc build-up, increase a yield stress thereof and reduce turbulence thereof, to thereby produce a non-turbulent in-line flow of flocculated material.

18. The method of claim 17, wherein providing the turbulent flow regime comprises regulating a feed flow rate of the thick fine tailings above a minimum threshold; configuring a pipeline assembly to have a sufficiently small pipe diameter, wherein the pipeline assembly transports the turbulent feed and the in-line turbulent flow of flocculating tailings material; and ensuring a sufficiently low viscosity of the in-line flow of the thick fine tailings upon addition of the flocculant.

19. The method of claim 17, wherein the adding of the flocculant comprises co-annularly injecting a plurality of jets comprising the flocculant into the turbulent feed.

20. The method of claim 19, wherein the jets comprising the flocculant extend into the turbulent feed co-directionally with the flow direction thereof.

21. A system for treating thick fine tailings, comprising:
a feed pipeline assembly for providing an in-line flow of the thick fine tailings;
a pump for pumping the in-line flow of the thick fine tailings;
an in-line addition assembly in fluid communication with the feed pipeline assembly for adding a flocculant into the in-line flow of the thick fine tailings to produce an in-line flow of flocculating tailings material;
wherein the pump, the feed pipeline assembly and the in-line addition assembly are configured to ensure the thick fine tailings has a turbulent flow regime upon addition of the flocculant;
a floc build-up pipeline assembly in fluid communication with the in-line addition assembly and configured to shear the in-line flow of the flocculating tailings material to increase a yield stress thereof and to produce a non-turbulent in-line flow of flocculated material;
a shear conditioning pipeline assembly configured to shear condition the non-turbulent in-line flow of flocculated material to decrease the yield stress thereof and produce a conditioned flocculated tailings material that is within a water release zone wherein water separates from the conditioned flocculated tailings material; and
a dewatering unit in fluid communication with the shear conditioning pipeline assembly for receiving and dewatering the conditioned flocculated tailings material.

22. The system of claim 21, wherein the in-line addition assembly comprising an injector for adding a solution comprising the flocculant into the in-line flow of the thick fine tailings.

23. The system of claim 22, further comprising a flocculant addition controller for controlling the addition of the flocculant into the in-line flow of the thick fine tailings.

24. The system of claim 23, wherein the flocculant addition controller is configured to provide ratio control of the flocculant with respect to the in-line flow of the thick fine tailings.

25. The system of claim 21, wherein the dewatering unit comprises a sub-aerial deposition site.

26. A method of treating thick fine tailings, comprising:
dispersing a flocculant into the thick fine tailings having a turbulent flow regime to produce a turbulent flocculating tailings material;
subjecting the turbulent flocculating tailings material to shear to build-up flocs and increase a yield stress thereof, to produce a flocculated material having a non-turbulent flow regime; and shear conditioning the flocculated material to decrease the yield stress thereof and produce a conditioned flocculated tailings material that is within a water release zone wherein water separates from the conditioned flocculated tailings material; and dewatering the conditioned flocculated tailings material.

27. The method of claim 26, wherein the dispersing of the flocculant into the thick fine tailings is performed in-line.

28. A method of treating thick fine tailings, comprising:
providing a thick fine tailings flow in an upstream pipeline section;
contacting the thick fine tailings flow with a flocculant to produce a flocculation tailings in a dispersion pipeline zone;
transporting the flocculation tailings through a downstream pipeline section; and
dewatering the flocculation tailings;
wherein the upstream pipeline section and the dispersion pipeline zone are configured and the thick fine tailings flow is provided so as to have a turbulent flow regime in both the upstream pipeline section and the dispersion pipeline zone, and
wherein the upstream pipeline section has a pipe diameter of at most 12 inches and the dispersion pipeline zone has a pipe diameter sufficient to ensure turbulence and mixing in the dispersion pipeline zone.

29. The method of claim 28, wherein the thick fine tailings flow has a flow rate that is controlled in accordance with rheological characteristics of the thick fine tailings and pipe diameter of the upstream pipeline section.

30. A method of treating thick fine tailings, comprising:
providing a thick fine tailings flow in an upstream pipeline section;
contacting the thick fine tailings flow with a flocculant to produce a flocculation tailings in a dispersion pipeline zone;
transporting the flocculation tailings through a downstream pipeline section; and
dewatering the flocculation tailings;
wherein the upstream pipeline section and the dispersion pipeline zone are configured and the thick fine tailings flow is provided so as to have a turbulent flow regime in both the upstream pipeline section and the dispersion pipeline zone; and
wherein the downstream pipeline section has a pipe diameter sufficiently large such that the flocculation tailings flowing therethrough has a non-turbulent or laminar flow regime.

31. The method of claim 30, wherein the dispersion pipeline zone has a pipe diameter of at most 6 inches.

32. The method of claim 28, wherein the thick fine tailings comprise mature fine tailings (MFT).

33. The method of claim 28, wherein the thick fine tailings comprises tailings derived from an oil sands extraction operation.

34. The method of claim 28, wherein the thick fine tailings are retrieved from a tailings pond.

35. A method of treating thick fine tailings, comprising:
dispersing a flocculant into the thick fine tailings to produce a flocculating tailings material;
subjecting the flocculating tailings material to shear to build-up flocs and increase a yield stress thereof, to produce a non-turbulent in-line flow of flocculated material;
shear conditioning the non-turbulent in-line flow of flocculated material to decrease the yield stress thereof and produce a conditioned flocculated tailings material that is within a water release zone wherein water separates from the conditioned flocculated tailings material,
managing flow conditions to inhibit backpressure oscillations caused by increased yield stress of the flocculated tailings; and
dewatering the conditioned flocculated tailings material.

36. The method of claim 35, wherein the step of managing flow conditions comprises configuring a shear conditioning pipeline assembly transporting the non-turbulent in-line flow of flocculated material to have a sufficiently large pipe diameter to inhibit backpressure oscillations.

37. The method of claim 36, wherein the step of configuring the shear conditioning pipeline assembly is performed based on properties of the non-turbulent in-line flow of flocculated material.

38. The method of claim 37, wherein the properties include yield stress.

39. The method of claim 38, wherein the step of configuring the shear conditioning pipeline assembly is performed based on flow rates of the thick fine tailings and/or the non-turbulent in-line flow of flocculated material.

40. The method of claim 35, wherein the step of managing flow conditions comprises providing a turbulent flow regime of the thick fine tailings upon contact with the flocculant.

41. The method of claim 35, wherein the flocculant is provided as a flocculant solution.

42. The method of claim 41, wherein the flocculant solution has a concentration of flocculant of 0.1 wt. % to 1 wt. %.

43. The method of claim 41, wherein the flocculant solution is an aqueous solution comprising ≤5 wt. %, ≤2 wt. %, ≤1.5 wt. %, ≤1 wt. %, ≤0.6 wt. % or ≤0.4 wt. % of the flocculant.

44. The method of claim 35, wherein the flocculant comprises an anionic polymer flocculant.

45. The method of claim 35, wherein the step of managing flow conditions is provided so as to attenuate oscillations in thick fine tailings flow rate to an average attenuated oscillation amplitude of at most 20 m$^3$/hr.

46. The method of claim 35, wherein the step of managing flow conditions is provided so as to attenuate oscillations in flocculant flow rate to an average attenuated oscillation amplitude of at most 5 m$^3$/hr.

47. The method of claim 35, wherein the step of managing flow conditions comprises:
pumping the thick fine tailings using a first pump;
controlling the first pump based on a flow rate set point of the thick fine tailings;
pumping the flocculant solution using a second pump;
controlling the second pump based on a flow rate set point of the flocculant solution; and
regulating the flow rate set point of the flocculant solution based on flow rate, density and/or clay content of the thick fine tailings.

48. The method of claim 47, wherein the first and second pumps are centrifugal pumps or positive placement pumps.

49. The method of claim 35, wherein the step of managing flow conditions comprises avoiding flow restrictions with respect to the non-turbulent in-line flow of flocculated material, avoiding obstructions with respect to the non-turbulent in-line flow of flocculated material, avoiding pipeline diameter reductions with respect to the non-turbulent in-line flow of flocculated material, or providing a substantially constant pipe diameter for transporting the flocculating tailings material and the non-turbulent in-line flow of flocculated material.

50. A method of treating thick fine tailings, comprising:
pumping the thick fine tailings to provide an in-line thick fine tailings flow;
pumping a flocculant solution comprising a flocculant to provide an in-line flocculation solution flow,
contacting the in-line thick fine tailings flow with the in-line flocculant solution flow to produce a flocculation tailings;
shear conditioning the flocculation tailings to produce a conditioned flocculated tailings material;
dewatering the conditioned flocculated tailings material; and
implementing a flow control strategy comprising:
   setting a substantially constant flow rate for the in-line thick fine tailings flow; and
   setting a substantially constant flocculant dosage of the in-line flocculant solution flow based on flow rate, density and/or clay content of the in-line thick fine tailings flow;
   wherein the substantially constant flow rate of the in-line thick fine tailings flow is above a minimum threshold to provide sufficient turbulence to substantially attenuate oscillations in both the flow rate of the in-line flocculant solution flow and the in-line thick fine tailings flow; and
   wherein the flow rate of the thick fine tailings flow is turbulent.

51. The method of claim 50, wherein the flow rate of the thick fine tailings flow is at least 400 m$^3$/hr within a pipeline having a diameter of at most 12 inches.

52. The method of claim 50, wherein the flow rate of the in-line thick fine tailings flow is sufficient to attenuate oscillations in thick fine tailings flow rate and/or attenuate oscillations in flocculant flow rate by at least 90% based on average oscillation amplitude.

53. The method of claim 50, further comprising providing the in-line thick fine tailings flow with a flow rate sufficient to attenuate oscillations in the in-line flocculant solution flow.

54. The method of claim 50, further comprising reducing air content in the flocculant solution prior to injection into the in-line thick tailings flow.

55. A method of treating thick fine tailings, comprising:
pumping the thick fine tailings to provide an in-line thick fine tailings flow;
pumping a flocculant solution comprising a flocculant to provide an in-line flocculation solution flow,
contacting the in-line thick fine tailings flow with the in-line flocculant solution flow to produce a flocculation tailings;
shear conditioning the flocculation tailings to produce a conditioned flocculated tailings material;
dewatering the conditioned flocculated tailings material; and
implementing a flow control strategy comprising:
   setting a substantially constant flow rate for the in-line thick fine tailings flow; and
   setting a substantially constant flocculant dosage of the in-line flocculant solution flow based on flow rate, density and/or clay content of the in-line thick fine tailings flow;
   wherein the substantially constant flow rate of the in-line thick fine tailings flow is above a minimum threshold to provide sufficient turbulence to substantially attenuate oscillations in both the flow rate of the in-line flocculant solution flow and the in-line thick fine tailings flow; and
   wherein the flow rate of the in-line thick fine tailings flow is sufficient to attenuate oscillations in thick fine tailings flow rate and/or attenuate oscillations in flocculant flow rate by at least 90% based on average oscillation amplitude.

* * * * *